United States Patent
Kasmir et al.

(10) Patent No.: US 9,172,920 B1
(45) Date of Patent: Oct. 27, 2015

(54) DOORBELL DIAGNOSTICS

(71) Applicant: SkyBell Technologies, Inc., Irvine, CA (US)

(72) Inventors: Seton Paul Kasmir, San Diego, CA (US); Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/671,677

(22) Filed: Mar. 27, 2015

Related U.S. Application Data

(63) Continuation-in-part of application No. 14/588,881, filed on Jan. 2, 2015, and a continuation-in-part of application No. 14/612,376, filed on Feb. 3, 2015, now Pat. No. 9,058,738.

(51) Int. Cl.
*H04N 7/18* (2006.01)
*H04N 9/47* (2006.01)
*H02J 3/14* (2006.01)

(52) U.S. Cl.
CPC .......... *H04N 7/186* (2013.01); *H02J 2003/143* (2013.01)

(58) Field of Classification Search
CPC ... H04N 7/186; H02J 2003/143; Y04S 20/38; Y02B 70/3266
USPC ......................................... 348/143
See application file for complete search history.

(56) References Cited

U.S. PATENT DOCUMENTS

| | | |
|---|---|---|
| 3,708,742 A | 1/1973 | Gunn |
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 5,428,388 A | 6/1995 | Von Bauer |
| 5,493,618 A | 2/1996 | Stevens |
| 5,521,578 A | 5/1996 | DelValle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,995,139 A | 11/1999 | Lee |
| 6,028,626 A | 2/2000 | Aviv |

(Continued)

FOREIGN PATENT DOCUMENTS

| | | |
|---|---|---|
| CN | 1902609 | 1/2007 |
| CN | 202872976 | 4/2013 |

(Continued)

OTHER PUBLICATIONS iDoorCam—A Wi-Fi Enabled, Webcam Doorbell—Downloaded on Sep. 3, 2013 from http://www.idoorcam.com/.

(Continued)

*Primary Examiner* — Andy Rao
*Assistant Examiner* — Jared Walker

(57) ABSTRACT

A doorbell can be configured to wirelessly communicate with a remote computing device. In some cases, components that enable the doorbell to wirelessly communicate with the remote computing device could make the doorbell incompatible with certain types of chimes. In some embodiments, the doorbell is configured to diagnose chime compatibility issues.

30 Claims, 18 Drawing Sheets

(56) References Cited

U.S. PATENT DOCUMENTS

| | | |
|---|---|---|
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| D577,301 S | 9/2008 | Johnson |
| 7,429,924 B2 | 9/2008 | Langer |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,738,917 B2 | 6/2010 | Ryley |
| 7,746,223 B2 | 6/2010 | Howarter |
| 7,752,070 B2 | 7/2010 | Hatcher |
| 8,016,676 B2 | 9/2011 | Carter |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,953,040 B1 | 2/2015 | Scalisi et al. |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0097248 A1 | 5/2005 | Kelley |
| 2005/0285944 A1 | 12/2005 | Watanabe |
| 2006/0010504 A1 | 1/2006 | Sharma |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0126574 A1 | 6/2007 | Langer |
| 2007/0194945 A1 | 8/2007 | Atkinson |
| 2008/0036862 A1 | 2/2008 | Lang |
| 2008/0128586 A1 | 6/2008 | Johnson |
| 2008/0167072 A1 | 7/2008 | Berstis |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0195810 A1 | 8/2010 | Mota |
| 2010/0245060 A1 | 9/2010 | Tylicki |
| 2010/0276570 A1 | 11/2010 | Moser |
| 2011/0207509 A1 | 8/2011 | Crawford |
| 2011/0287718 A1 | 11/2011 | Abel |
| 2012/0027248 A1 | 2/2012 | Feris |
| 2012/0044049 A1 | 2/2012 | Vig |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327246 A1 | 12/2012 | Senior |
| 2013/0045763 A1 | 2/2013 | Ruiz |
| 2013/0057695 A1 | 3/2013 | Huisking |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0088761 A1 | 3/2014 | Shamlian |
| 2014/0125754 A1 | 5/2014 | Haywood |
| 2014/0149706 A1 | 5/2014 | Shim |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi et al. |
| 2015/0061859 A1 | 3/2015 | Matsuoka |
| 2015/0063559 A1 | 3/2015 | Siminoff |
| 2015/0070495 A1 | 3/2015 | Scalisi et al. |
| 2015/0092055 A1 | 4/2015 | Scalisi et al. |
| 2015/0112885 A1 | 4/2015 | Fadell |

FOREIGN PATENT DOCUMENTS

| | | |
|---|---|---|
| CN | 202939738 | 5/2013 |
| EP | 684743 | 11/1995 |
| GB | 2400958 | 10/2004 |
| WO | 01/93220 | 12/2001 |
| WO | WO2007111802 | 10/2007 |

OTHER PUBLICATIONS

Squaritz IDS—Intelligent Doorbell System—Downloaded on Aug. 15, 2013 from http://www.indiegogo.com/projects/squaritz-ids-intelligent-doorbell-system.

Wireless Video Doorbell Pager—Downloaded on Aug. 9, 2013 from http://www.indiegogo.com/projects/wireless-video-doorbell-pager--4.

Lockitron—Downloaded on Jul. 24, 2013 from https://lockitron.com/preorder.

(56) References Cited

OTHER PUBLICATIONS

Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYl.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome peephole doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0x1qx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyInterCom video system—Downloaded on Jun. 8, 2015 from http://myintercom.de/en/funktionsweise.
Doorbot—Downloaded on Nov. 18, 2013 from http://www.craigncompany.com/home-tech-doorbot/; prior art publication at least as of Jun. 10, 2013.
Doorbot—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Doorbot—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Nov. 18, 2013 from http://www.getdoorbot.com/.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/024716501/files/DoorBotMediaKit.pdf?17037.
Doorbot "features kit"—Downloaded on Nov. 18, 2013 from http://cdn.shopify.com/s/files/1/0247/6501/files/DoorBot_Features_Kit.pdf?17037.
CellNock index page—Originally downloaded on Sep. 23, 2013 from http://cellnock.com/index.html; The website says CellNock is "patent pending".
CellNock about founder page—downloaded on Nov. 18, 2013 from http://cellnock.com/index.html; The website says CellNock is "patent pending".
CellNock learn more page—Downloaded on Nov. 18, 2013 from http://cellnock.com/learn_more.htm; The website says CellNock is "patent pending".
CellNock product page—Downloaded on Nov. 18, 2013 from http://cellnock.com/products.htm; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com)—Downloaded on Nov. 18, 2013 from http://www.myskybell.com/.
MySkyBell.com—Part 2 (previously iDoorCam.com)—Downloaded on Nov. 18, 2013 from http://www.myskybell.com/.
MySkyBell.com—Part 3 (previously iDoorCam.com)—Downloaded on Nov. 18, 2013 from http://www.myskybell.com/.
MySkyBell.com—Part 4 (previously iDoorCam.com)—Downloaded on Nov. 18, 2013 from http://www.myskybell.com/.
MySkyBell.com—Part 5 (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
EyeTalk for home—Downloaded on May 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYl; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.
August Smart Lock—Part 1—Downloaded on Jun. 10, 2014 from www.August.com.
August Smart Lock—Part 2—Downloaded on Jun. 10, 2014 from www.August.com.
August Smart Lock—Part 3—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.

(56) References Cited

OTHER PUBLICATIONS

AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.

DOORBELL DIAGNOSTICS

CROSS-REFERENCE TO RELATED APPLICATIONS

This application claims the benefit of and is a continuation-in-part of U.S. Nonprovisional patent application Ser. No. 14/588,881; filed Jan. 2, 2015; and entitled DOORBELL COMMUNICATION AND ELECTRICAL SYSTEMS. The entire contents of patent application Ser. No. 14/588,881 are incorporated by reference herein.

U.S. Nonprovisional patent application Ser. No. 14/588,881 is a continuation-in-part of U.S. Nonprovisional patent application Ser. No. 14/474,210; filed Sep. 1, 2014; and entitled DOORBELL COMMUNICATION AND ELECTRICAL SYSTEMS. The entire contents of patent application Ser. No. 14/474,210 are incorporated by reference herein.

U.S. Nonprovisional patent application Ser. No. 14/474,210 is a continuation of U.S. Nonprovisional patent application Ser. No. 14/474,209; filed Sep. 1, 2014; and entitled DOORBELL COMMUNICATION AND ELECTRICAL METHODS. The entire contents of patent application Ser. No. 14/474,209 are incorporated by reference herein.

This application claims the benefit of and is a continuation-in-part of U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

BACKGROUND

1. Field

Various embodiments disclosed herein relate to doorbell systems. Certain embodiments relate to doorbell electrical systems.

2. Description of Related Art

Buildings often have doorbells located at points of entry so visitors can alert occupants of the building of the visitor's arrival. The doorbells typically have chimes inside the building that emit a notification sound in response to a visitor pressing a doorbell button. The chimes can be mechanical chimes or electronic chimes.

Mechanical chimes often include two flat metal bar resonators, which are struck by plungers operated by two solenoids. Mechanical chimes can include an electromagnet that causes a hammer to physically strike a metal surface such as a buzzer. Mechanical chimes typically require electricity for a short duration of time to produce the notable "ding-dong" sound, which is the result of the plungers striking the metal bars.

Electronic chimes often use a speaker and a circuit board containing music data. As such, electronic chimes can be capable of playing a wider variety of sounds than the typical "ding-dong" sound. Electronic chimes may require electricity over a longer period of time than their mechanical predecessors.

However, the notification sound emitted by mechanical chimes and electronic chimes can typically only be heard within a short distance from the chime itself. For example, a homeowner located remotely from her home might not be able to hear the notification sound, and thus, would not be aware that a visitor is ringing her doorbell. Thus, there is a need for devices and methods to alert remotely located individuals that a visitor seeks the attention of the building occupant.

SUMMARY

Some embodiments include a doorbell that has a camera and a button. The camera can be configurable to visually detect a visitor. The button can be configurable to enable the visitor to sound an external chime. An adapter (e.g., an electronic switch assembly) can be electrically coupled to the electronic doorbell and an external power supply. The external chime can be electrically coupled to the adapter. The external chime can be a mechanical chime or an electronic chime. Some electronic chimes comprise a speaker configurable to emit a summon sound in response to the visitor pressing the button of the electronic doorbell. The summon sound can be a downloaded audio file such as a song or a "ding-dong" sound from a music data file.

In several embodiments, a doorbell is configured to wirelessly communicate with a remote computing device (e.g., a smartphone or a laptop). The doorbell can be configured to be electrically coupled to an external power supply and to an external chime. The external power supply can be a building's power supply (e.g., a transformer that supplies electricity that is suitable for doorbells and chimes). The external chime, which is external relative to the doorbell, can be located inside the building. In some embodiments, the external chime is located outside the building. The doorbell can include a button that is configurable to enable a visitor to sound the external chime. The button and the first load evaluation system can be coupled to the outer housing of the doorbell.

In some embodiments, the doorbell includes a first load evaluation system configured to evaluate a first load signature of the external chime. The doorbell can send a first notification to the remote computing device in response to the first load signature being indicative of the external chime being an electronic chime rather than a mechanical chime. In several embodiments, the doorbell sends the first notification to the remote computing device via a wireless network, a server, a cellular network, and/or the Internet. The first notification can include information related to obtaining a chime adapter. For example, the first notification can instruct a user that she needs a chime adapter and/or how to buy a chime adapter. The first notification can offer to sell the user a chime adapter.

In several embodiments, the chime adapter is configured such that a first electricity that is less than a first threshold passes through the chime adapter so the first electricity does not cause the external chime to emit a summon sound, and the chime adapter is configured such that a second electricity that is greater than a second threshold causes the external chime to emit the summon sound.

In some embodiments, the first load signature is a first power signature, a first current signature, and/or a first voltage signature. Embodiments can analyze different types of signatures to identify signals that are indicative of incompatible chimes. Then, the system can notify the user that she needs a new chime and/or a chime adapter.

In several embodiments, the first load evaluation system is configured to detect a variable power load. The doorbell can be configured to send the first notification in response to detecting that the external chime comprises the variable power load within a predetermined range. In some embodiments, the range is configured such that variability above a certain threshold indicates the chime is incompatible.

In some embodiments, the first load evaluation system is configured to detect a constant power load. The doorbell can be configured to not send the first notification in response to detecting that the external chime comprises the constant power load. For example, a mechanical chime can have a much more constant power load than an electronic chime when a visitor is not pressing the doorbell button.

In several embodiments, the first load evaluation system is configured to detect a waveform of the first load signature. The doorbell can be configured to send the first notification in response to determining that the waveform of the first load signature meets at least one predetermined requirement. The predetermined requirement can be a waveform indicative of an electronic chime, a microprocessor, and/or of a printed circuit board with electronic components.

In some embodiments, the first load evaluation system is configured to detect a magnitude of the first load signature. The doorbell can be configured to send the first notification in response to determining that the magnitude of the first load signature meets at least one predetermined requirement. The predetermined requirement can be a magnitude that is greater than a predetermined threshold (e.g., indicative of the electronic chime consuming electrical power).

In some embodiments, the doorbell measures the first load signature during a period when a visitor is not pressing the button of the doorbell. Thus, the first load signature can reflect behavior when the chime is not activated (e.g., is not "ringing").

In several embodiments, a second load evaluation system is configured to detect a second load signature of the doorbell. The doorbell can be configured to determine that the first load signature is indicative of the external chime being the electronic chime by analyzing a circuit that comprises the doorbell and the external chime. The circuit can comprise a third load signature. Analyzing the circuit can comprise reducing at least one effect of the second load signature on the third load signature to evaluate the first load signature. For example, the second load signature can be "subtracted" from the third load signature to estimate the first load signature.

In some embodiments, a second load evaluation system is configured to detect a second load signature of the doorbell. A load comparison system can be configured to measure electrical traits of a circuit. The circuit can comprise the doorbell and the external chime. The load comparison system can be configured to evaluate the first load signature by reducing at least one effect of the second load signature on the electrical traits of the circuit.

In several embodiments, a doorbell is configured to wirelessly communicate with a remote computing device. The doorbell can be electrically coupled to an external power supply and to an external chime. The doorbell can include a first load measurement system configured to measure a first load signature of a circuit that comprises the doorbell and the external chime; a second load measurement system configured to measure a second load signature of the doorbell; and/or a load evaluation system configured to reduce an electrical effect of the second load signature on the first load signature to enable the doorbell to evaluate a third load signature of the external chime.

In some embodiments, a wireless communication system is configured to send a first notification to the remote computing device in response to the third load signature being indicative of the external chime being incompatible with the doorbell. The first notification can include information related to chime compatibility. For example, the notification can say, "Your chime is not compatible with your doorbell. Please buy a new chime or buy a chime adapter." The notification can also include a link to buy a new chime or a chime adapter.

In several embodiments, a wireless communication system is configured to send a first notification to the remote computing device in response to the third load signature being indicative of the external chime being an electronic chime rather than a mechanical chime.

In some embodiments, the doorbell comprises an outer housing. The first load measurement system, the second load measurement system, and the load evaluation system can be located inside the outer housing of the doorbell.

In some embodiments, methods for using a doorbell configured to wirelessly communicate with a remote computing device include coupling electrically the doorbell to an external power supply and to an external chime. The external chime can comprise a first load signature. Several embodiments include evaluating the first load signature of the external chime with the doorbell and sending a first notification to the remote computing device in response to the first load signature being indicative of the external chime being incompatible with the doorbell.

The external chime can be incompatible with the doorbell because the external chime is an electronic chime (rather than a mechanical chime) without a chime adapter configured to enable electricity below a threshold to bypass the external chime such that the electricity does not cause the external chime to emit a summon sound (e.g., a "ding-dong" sound or another sound configured to audibly notify building occupants regarding a visitor). The chime adapter can enable the electricity to bypass the external chime this way, even when the chime adapter is mounted inside an outer housing that includes the external chime.

In several embodiments, the first notification includes information related to obtaining a chime adapter. This information can tell a user that she needs a chime adapter. This information can also be configured to enable the user to order a chime adapter and then receive the chime adapter (e.g., in response to interacting with the first notification).

Some embodiments comprise creating a circuit that includes the doorbell, the chime adapter, and the external power supply in response to the first notification. For example, the user can receive the first notification, which can instruct the user to get the chime adapter. Then, the user can create the circuit. Embodiments can also include electrically coupling the chime adapter to the external chime in response to the first notification.

In some embodiments, evaluating the first load signature of the external chime comprises evaluating a second load signature of the doorbell. Evaluating the first load signature of the external chime can include evaluating a second load signature of the doorbell; evaluating a third load signature of a circuit that comprises the doorbell, the external power supply, and the external chime; and/or reducing at least one effect of the second load signature on the third load signature to estimate the first load signature. Reducing the effect can help isolate the first load signature of the external chime (e.g., by removing the effects of the second load signature of the doorbell on the third load signature of the circuit). This way, the doorbell can analyze the load signature of the external chime to determine if the external chime is compatible with the doorbell, if a different chime is necessary to be compatible with the doorbell, or if a chime adapter must be electrically coupled to the external chime to make the external chime compatible with the doorbell.

In several embodiments, analyzing the load signatures includes analyzing the powers, the currents, and/or the voltages of the load signatures. For example, powers, currents, and voltages of the external chime can enable the doorbell to determine if the external chime is compatible with the doorbell. Powers that are too large (e.g., when the chime is not emitting a notification sound) can indicate that the external chime is not compatible with the doorbell. Currents that are too variable (e.g., when the chime is not emitting a notification sound) can indicate that the external chime is not compatible with the doorbell.

Some embodiments include determining that the first load signature is indicative of the external chime being incompatible with the doorbell in response to a variability of the first load signature; in response to a waveform of the first load signature; and/or in response to a magnitude of the first load signature.

Some embodiments include a doorbell system that comprises an electronic doorbell comprising a camera and a button, wherein the camera is configurable to visually detect a visitor and the button is configurable to enable the visitor to sound an electronic chime; an electronic switch assembly electrically coupled to the electronic doorbell and a transformer; and/or an electronic chime electrically coupled to the electronic switch assembly. The electronic chime can comprise a speaker configurable to emit a notification sound in response to the visitor pressing the button of the electronic doorbell. The electronic switch assembly may define a first state and a second state. The first state may occur in response to a first electricity that is less than a first threshold, and the second state may occur in response to a second electricity that is greater than the first threshold. In the first state the electronic switch assembly may block the first electricity from passing through the electronic chime so that the electronic chime does not emit a notification sound. In the second state the electronic switch assembly may allow the second electricity to pass through the electronic chime so that the electronic chime emits the notification sound.

In several embodiments, the electronic chime may comprise a first printed circuit board configured to enable the electronic chime to emit the notification sound from the speaker based on digital music data. The electronic doorbell may also comprise a second printed circuit board configured to block the second electricity from entering the second printed circuit board of the electronic doorbell in response to the visitor pressing the button.

In the first state, the electronic switch assembly may allow the first electricity to pass through the electronic switch assembly. In several embodiments, the electronic switch assembly may be mechanically coupled to the electronic chime. Some embodiments of the doorbell system may comprise a plastic housing. The electronic chime and the electronic switch assembly may be located inside the plastic housing. The electronic doorbell may be located outside the plastic housing and in a remote location relative to the plastic housing.

Several embodiments of the doorbell system may further include a remote computing device configured to receive a predetermined amount of time from a user. The predetermined amount of time may define an amount of time that the second electricity is maintained above the first threshold.

In some embodiments, the electronic switch assembly may comprise a first electronic switch and a second electronic switch that is electrically coupled to the first electronic switch. In response to the first electricity: 1) the first electronic switch may allow the first electricity to flow through the electronic switch assembly and may not allow the first electricity to flow to the electronic chime, and 2) the second electronic switch may not allow the first electricity to flow to the electronic chime. In response to the second electricity, the first and second electronic switches may allow the second electricity to flow through the electronic chime. In several embodiments, the first electronic switch may comprise a double pole, single throw switch, and the second electronic switch may comprise a single pole, single throw switch.

In some embodiments, when the first electronic switch is in a first position, the first electronic switch may electrically connect the transformer and the electronic doorbell, and when the first electronic switch is in a second position, the first electronic switch may electrically connect the transformer and the electronic chime. As well, when the second electronic switch is in an open position, the second electronic switch may electrically disconnect the electronic doorbell and the electronic chime, and when the second electronic switch is in a closed position, the second electronic switch may electrically connect the electronic doorbell and the electronic chime. In some embodiments, when the first electronic switch is in the first position, the second electronic switch is in the open position, and when the first electronic switch is in the second position, the second electronic switch is in the closed position.

In several embodiments, when the first electronic switch is in a first position, the first electronic switch may electrically connect the transformer and the electronic doorbell, and when the first electronic switch is in a second position, the first electronic switch electrically connects the electronic chime and the electronic doorbell. As well, when the second electronic switch is in an open position, the second electronic switch electrically disconnects the transformer and the electronic chime, and when the second electronic switch is in a closed position, the second electronic switch electrically connects the transformer and the electronic chime. In some embodiments, when the first electronic switch is in the first position, the second electronic switch is in the open position. Furthermore, when the first electronic switch is in the second position, the second electronic switch may be in the closed position.

In some embodiments, the electronic switch assembly comprises a first electronic switch, a second electronic switch electrically connected to the first electronic switch, and a third electronic switch electrically connected to the first and second electronic switches, wherein in response to the first electricity: 1) the first electronic switch allows the first electricity to flow through the electronic switch assembly and does not allow the first electricity to flow to the electronic chime, and 2) the second and third electronic switches do not allow the first electricity to flow to the electronic chime. As well, in response to the second electricity: 1) the first electronic switch does not allow the second electricity to flow through the electronic switch assembly, and 2) the second and third electronic switches allow the second electricity to flow to the electronic chime. In several embodiments, the first electronic switch comprises a first single pole, single throw switch; the second electronic switch comprises a second single pole, single throw switch; and the third electronic switch comprises a third single pole, single throw switch.

In some embodiments, when the first electronic switch is in a closed position, the first electronic switch electrically connects the transformer and the electronic doorbell, and when the first electronic switch is in an open position, the first electronic switch electrically disconnects the transformer and the electronic doorbell. When the second electronic switch is in a closed position, the second electronic switch electrically connects the transformer and the electronic chime, and when the second electronic switch is in an open position, the second electronic switch electrically disconnects the transformer and the electronic chime. Accordingly, when the third electronic switch is in a closed position, the third electronic switch electrically connects the electronic doorbell and the electronic chime, and when the third electronic switch is in an open position, the third electronic switch electrically disconnects the electronic doorbell and the electronic chime.

Furthermore, in several embodiments of the doorbell system, when the first electronic switch is in the closed position, the second and third electronic switches are each in the open position. As well, when the first electronic switch is in the open position, the second and third electronic switches are each in the closed position.

Some embodiments include a doorbell system that includes an electronic doorbell comprising a camera and a button, wherein the camera is configurable to visually detect a visitor and the button is configurable to enable the visitor to sound an electronic chime, a printed circuit board electrically coupled to the electronic doorbell and a transformer, and an electronic chime electrically coupled to the printed circuit board and mechanically coupled to the printed circuit board. The electronic chime may comprise a speaker configurable to emit a notification sound in response to the visitor pressing the button of the electronic doorbell. The printed circuit board may be configured to block a first electricity that is less than a first threshold from entering the electronic chime. The first electricity does not cause the electronic chime to emit the notification sound. As well, the printed circuit board may be configured to allow the first electricity to pass through the printed circuit board.

In some embodiments, the printed circuit board is configured to allow a second electricity that is greater than the first threshold to enter the electronic chime. The second electricity may cause the electronic chime to emit the notification sound.

In several embodiments the printed circuit board comprises a base portion that defines a length that extends along a first direction and a width that extends along a second direction that is opposite the first direction. In some embodiments the length may be greater than the width. The printed circuit board may further comprise three tabs that extend from the length along the second direction. In some embodiments, each of the three tabs includes an aperture that extends through each of the three tabs along a third direction that is opposite the first direction and the second direction. In several embodiments, each of the apertures is configured to receive a threaded fastener, and wherein the printed circuit board is mechanically coupled to the electronic chime via three threaded fasteners.

In some embodiments, the printed circuit board is a first printed circuit board. The electronic doorbell may comprise a second printed circuit board configured to block the second electricity from entering the second printed circuit board of the electronic doorbell in response to the visitor pressing the button.

Furthermore, some embodiments include a method for using a doorbell system, wherein the doorbell system comprises an electronic doorbell, an electronic chime, and a remote computing device. The method may include obtaining the electronic doorbell that comprises a camera and a button, wherein the button is configurable to enable a visitor to sound an electronic chime, wherein the electronic chime comprises a speaker configurable to emit a notification sound in response to the visitor pressing the button of the electronic doorbell, electrically coupling an electronic switch assembly to the electronic chime; electrically coupling the electronic doorbell to the electronic switch assembly, configuring the electronic switch assembly so that a first electricity that is less than a first threshold passes through the electronic switch assembly without entering the electronic chime, wherein the first electricity does not cause the electronic chime to emit the notification sound, wherein the electronic switch assembly blocks the first electricity from passing through the electronic chime in response to the first electricity being less than the first threshold. Several embodiments include configuring the electronic switch assembly so that the electronic switch assembly causes a second electricity that is greater than the first threshold to pass through the electronic chime to cause the electronic chime to emit the notification sound, wherein the electronic switch assembly causes the second electricity to pass through the electronic chime in response to the second electricity being greater than the first threshold.

In several embodiments, the method may further include mechanically coupling the electronic switch assembly to the electronic chime. As well, some embodiments may include configuring an electrical circuit so that a third electricity passes from a transformer to the electronic doorbell to the electronic switch assembly and then back to the transformer without entering the electronic chime in response to the third electricity being less than the first threshold. Some embodiments may also include configuring the electrical circuit so that a fourth electricity passes from the transformer to the electronic doorbell and to the electronic switch assembly. The fourth electricity may be diverted from the electronic switch assembly into the electronic chime and then back into the electronic switch assembly in response to the fourth electricity being greater than the first threshold. The electronic doorbell and the electronic switch assembly may be in series in the electrical circuit.

In many embodiments, the electronic chime comprises an electronic chime having a first printed circuit board, and the method may further include configuring the first printed circuit board to enable the electronic chime to emit the notification sound from the speaker based on digital music data. In several embodiments, the electronic doorbell comprises a second printed circuit board, and the method may further include routing at least a portion of the first electricity through the second printed circuit board of the electronic doorbell. The method may further include blocking the second electricity from entering the second printed circuit board of the electronic doorbell in response to the visitor pressing the button. As well, the method may include causing the second electricity to be greater than the first threshold in response to the visitor pressing the button of the electronic doorbell.

In several embodiments the doorbell system comprises a plastic housing. The method may further include placing the electronic chime and the electronic switch assembly inside the plastic housing. As well, the method may include placing the electronic doorbell outside the plastic housing and in a remote location relative to the plastic housing.

Several embodiments may further include using the electronic switch assembly to block transformer electrical power from entering the electronic chime while the first electricity is less than the first threshold. As well, the method may include using the electronic switch assembly to divert the transformer electrical power from the electronic switch assembly into the electronic chime while the second electricity is greater than the first threshold.

In some embodiments, the first threshold is a first electrical power threshold. In several embodiments the first threshold is a first electrical voltage threshold. In some embodiments the first threshold is a first electrical current threshold.

In several embodiments, the method may further include setting a predetermined amount of time via the remote computing device prior to the second electricity exceeding the first threshold. The method may include sending the predetermined amount of time wirelessly from the remote computing device to the electronic doorbell. Once the second electricity is greater than the first threshold, the method may further include maintaining the second electricity above the first threshold for the predetermined amount of time.

Some embodiments include another method for using a doorbell system, wherein the doorbell system comprises an electronic doorbell, an electronic chime, and a remote computing device. The method may include obtaining the electronic doorbell that comprises a camera and a button, wherein the button is configurable to enable a visitor to sound an electronic chime, wherein the electronic chime comprises a speaker configurable to emit a notification sound in response to the visitor pressing the button of the electronic doorbell. The method may include mechanically coupling a printed circuit board to the electronic chime and electrically coupling the printed circuit board to the electronic chime. As well, the method may include electrically coupling the electronic doorbell to the printed circuit board and configuring the printed circuit board so that the printed circuit board allows a first electricity to pass through the printed circuit board in response to the first electricity being less than the threshold. The method may also include configuring the printed circuit board so that the printed circuit board blocks the first electricity from entering the electronic chime in response to the first electricity being less than the first threshold, wherein the first electricity does not cause the electronic chime to emit the notification sound.

In several embodiments, the printed circuit board may be a first printed circuit board, and the electronic doorbell may comprise a second printed circuit board. The method may further include routing at least a portion of the first electricity through the second printed circuit board of the electronic doorbell. The method may also include configuring the second printed circuit board to block the second electricity from entering the second printed circuit board of the electronic doorbell in response to the visitor pressing the button.

In some embodiments, the method may further include configuring the printed circuit board so that the printed circuit board causes a second electricity that is greater than the first threshold to enter the electronic chime to cause the electronic chime to emit the notification sound. The printed circuit board may cause the second electricity to pass through the electronic chime in response to the second electricity being greater than the first threshold.

Several embodiments may further include using the remote computing device to set a predetermined amount of time for the second electricity to stay above the first threshold. As well, the methods may include wirelessly sending the predetermined amount from the remote computing device to the electronic doorbell. In response to the second electricity being greater than the first threshold, the method may include using the electronic doorbell to maintain the second electricity above the first threshold for the predetermined amount of time.

In some embodiments, the doorbell system may include a plastic housing, and the electronic chime and the electronic switch assembly may be located inside the plastic housing and the electronic doorbell may be located outside the plastic housing and in a remote location relative to the plastic housing.

Some embodiments include using a doorbell system. The doorbell system may comprise an electronic doorbell, an electronic chime, and a remote computing device. The method may include obtaining the electronic doorbell that comprises a camera and a button. The button may be configurable to enable a visitor to sound an electronic chime, wherein the electronic chime comprises a speaker configurable to emit a notification sound in response to the visitor pressing the button of the electronic doorbell. The method may include mechanically coupling a printed circuit board to the electronic chime and electrically coupling the printed circuit board to the electronic chime. As well, the method may include electrically coupling the electronic doorbell to the printed circuit board. The method may also include configuring the electronic switch assembly so that the electronic switch assembly causes a second electricity that is greater than the first threshold to pass through the electronic chime to cause the electronic chime to emit the notification sound. The electronic switch assembly may cause the second electricity to pass through the electronic chime in response to the second electricity being greater than the first threshold.

In several embodiments, the printed circuit board is a first printed circuit board, and the electronic doorbell comprises a second printed circuit board. The method may further include routing at least a portion of the first electricity through the second printed circuit board of the electronic doorbell. The method may also include configuring the second printed circuit board to block the second electricity from entering the second printed circuit board of the electronic doorbell in response to the visitor pressing the button.

Many embodiments may further include maintaining the second electricity above the first threshold for a predetermined amount of time. In several embodiments, the method may include setting the predetermined amount of time via the remote computing device prior to the second electricity exceeding the first threshold, and sending the predetermined amount of time wirelessly from the remote computing device to the electronic doorbell.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
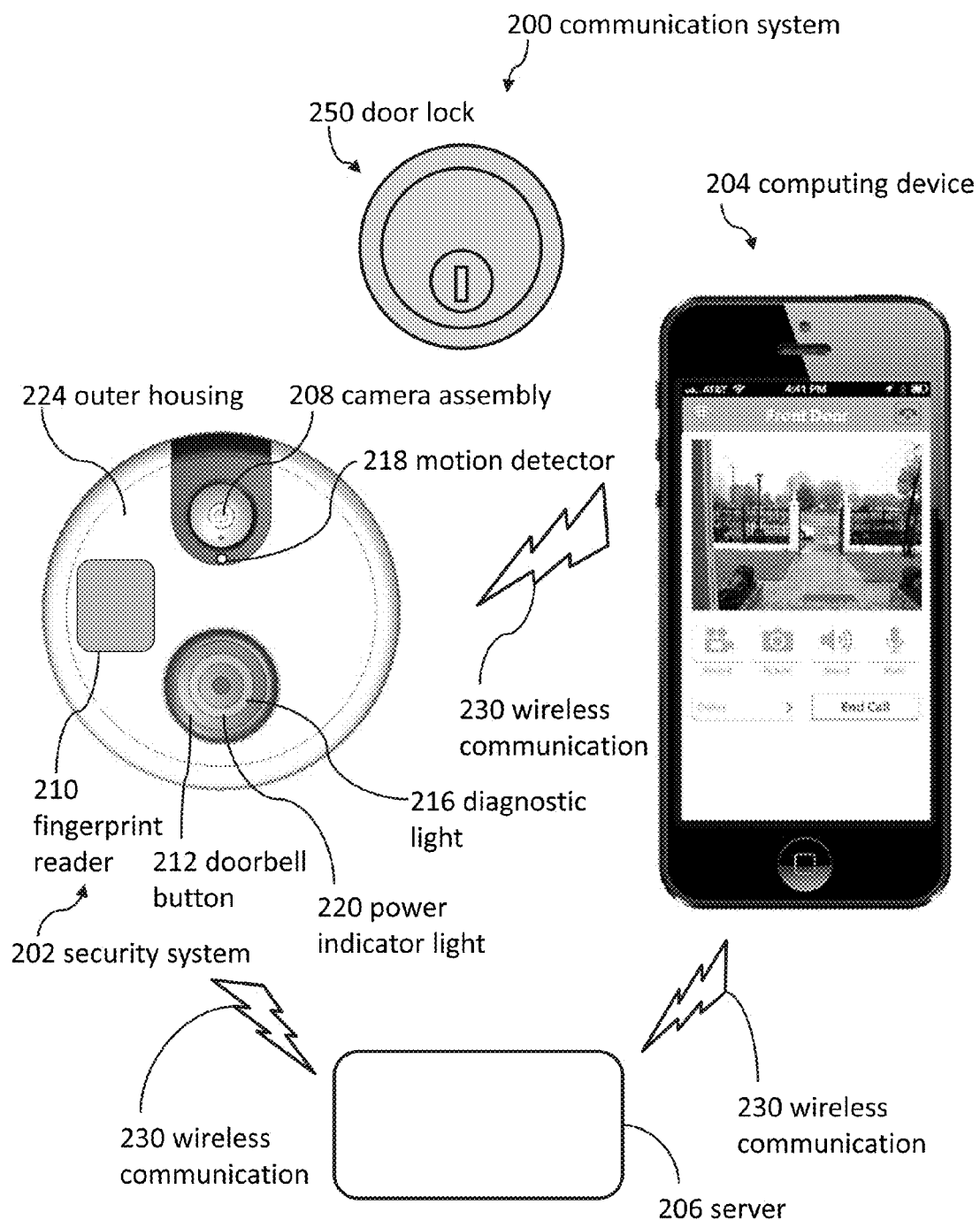
FIG. 1 illustrates a front view of a communication system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Buildings often have doorbell buttons located at points of entry. The doorbell buttons may be electrically connected to a chime located inside the building. Accordingly, when a visitor presses the doorbell button, this may cause a notification sound to be emitted from the chime to thereby alert the building occupants of the visitor's arrival. The chime can be a mechanical chime or an electronic chime.

Mechanical chimes often include two flat metal bar resonators, which are struck by plungers operated by two solenoids. Mechanical chimes can include an electromagnet that causes a hammer to physically strike a metal surface such as a buzzer. Mechanical chimes typically require electricity for a short duration of time to produce the notable "ding-dong" sound, which is the result of the plungers striking the metal bars.

Electronic chimes often include a speaker and a circuit board containing music data. As such, electronic chimes can be capable of playing a wider variety of sounds than the typical "ding-dong" sound. Electronic chimes may require electricity over a longer period of time than their mechanical predecessors.

As used herein, the term "electronic chime" refers to chimes that emit a notification sound from a speaker, utilize software, use digital sound files, include microprocessors, and/or can be programmed. Electronic chimes typically include a speaker and are configured to emit the notification sound from the speaker. Electronic chimes often include multiple notification sounds from which a user can choose. In a few embodiments, electronic chimes use software to play programmable music by mechanically striking sound elements (such as metal bars) according to the software.

As used herein, the term "mechanical chime" refers to chimes that rely on physical forces striking surfaces to emit a notification sound. Mechanical chimes do not utilize software, do not use digital sound files, and do not include microprocessors.

Doorbell System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

FIG. 1 illustrates a front view of a communication system embodiment. The communication system 200 can include a security system 202 (e.g., a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam. The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or Wi-Fi networks. Some embodiments enable communication via the Internet. Several embodiments enable wired communication between the security system 202 and the computing device 204. The wireless communication 230 can include the following communication means: radio, Wi-Fi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
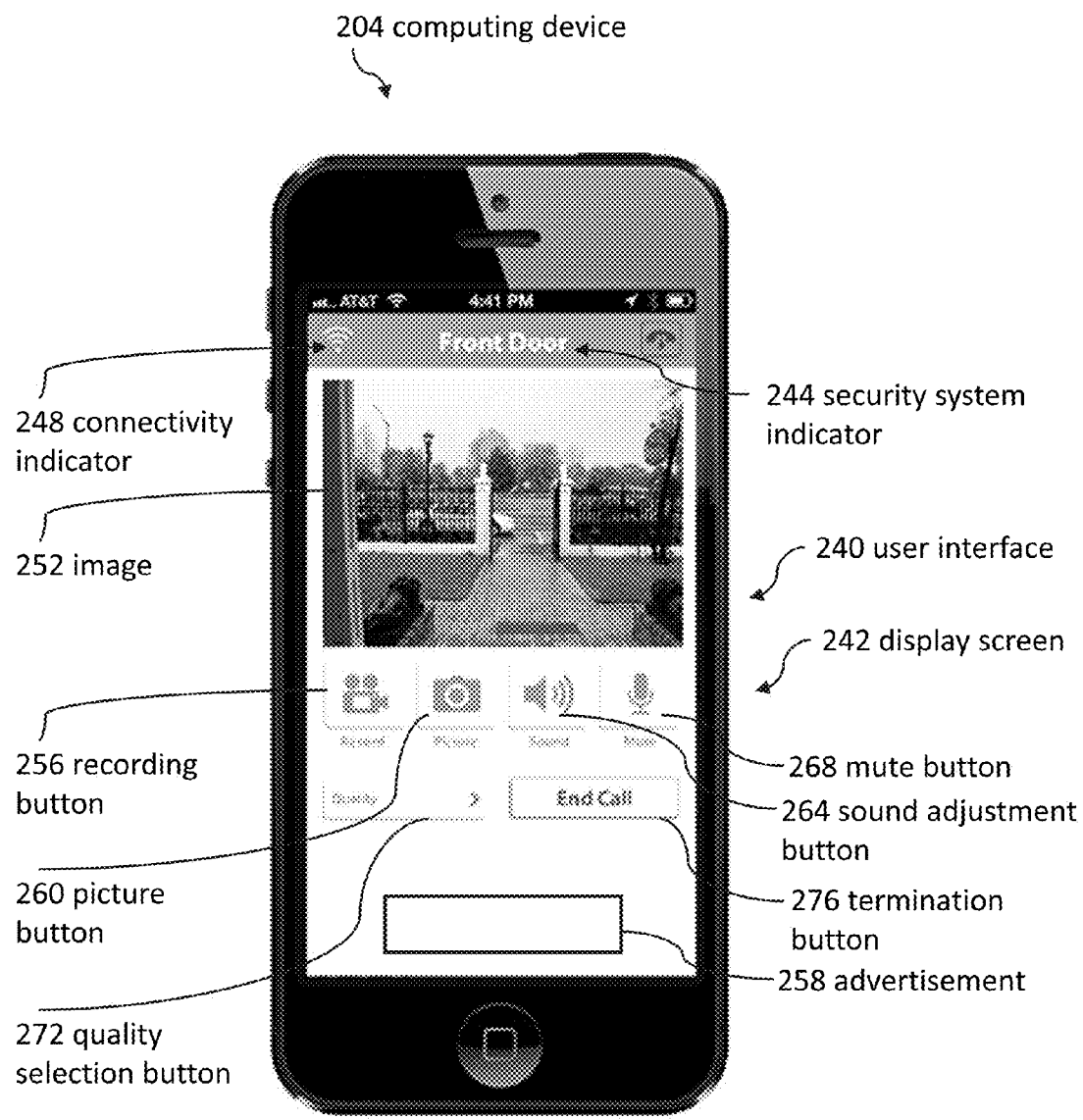
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation).

In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
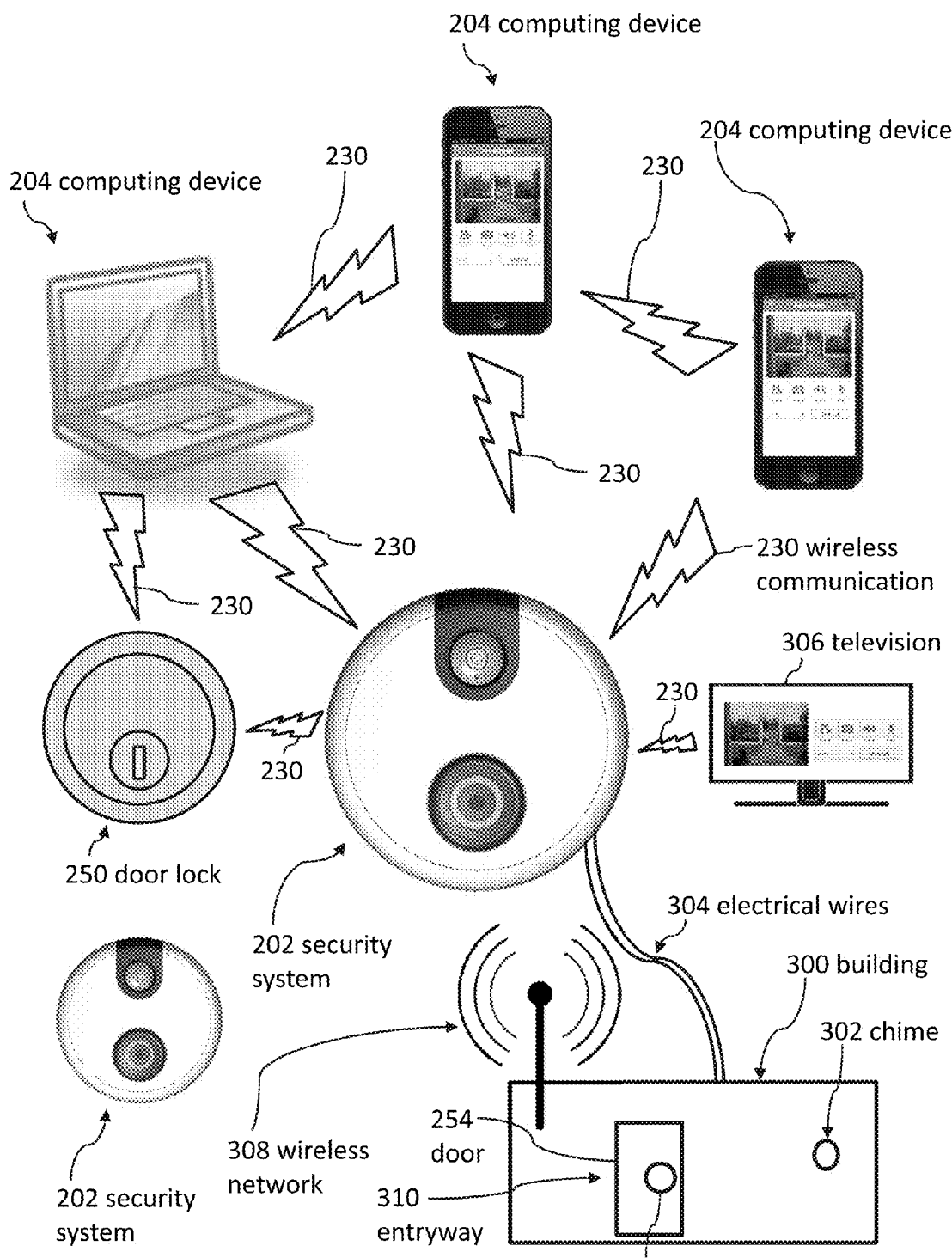
FIG. 3 illustrates an embodiment in which a security system is connected to a building, according to some embodiments.
Figure 4:
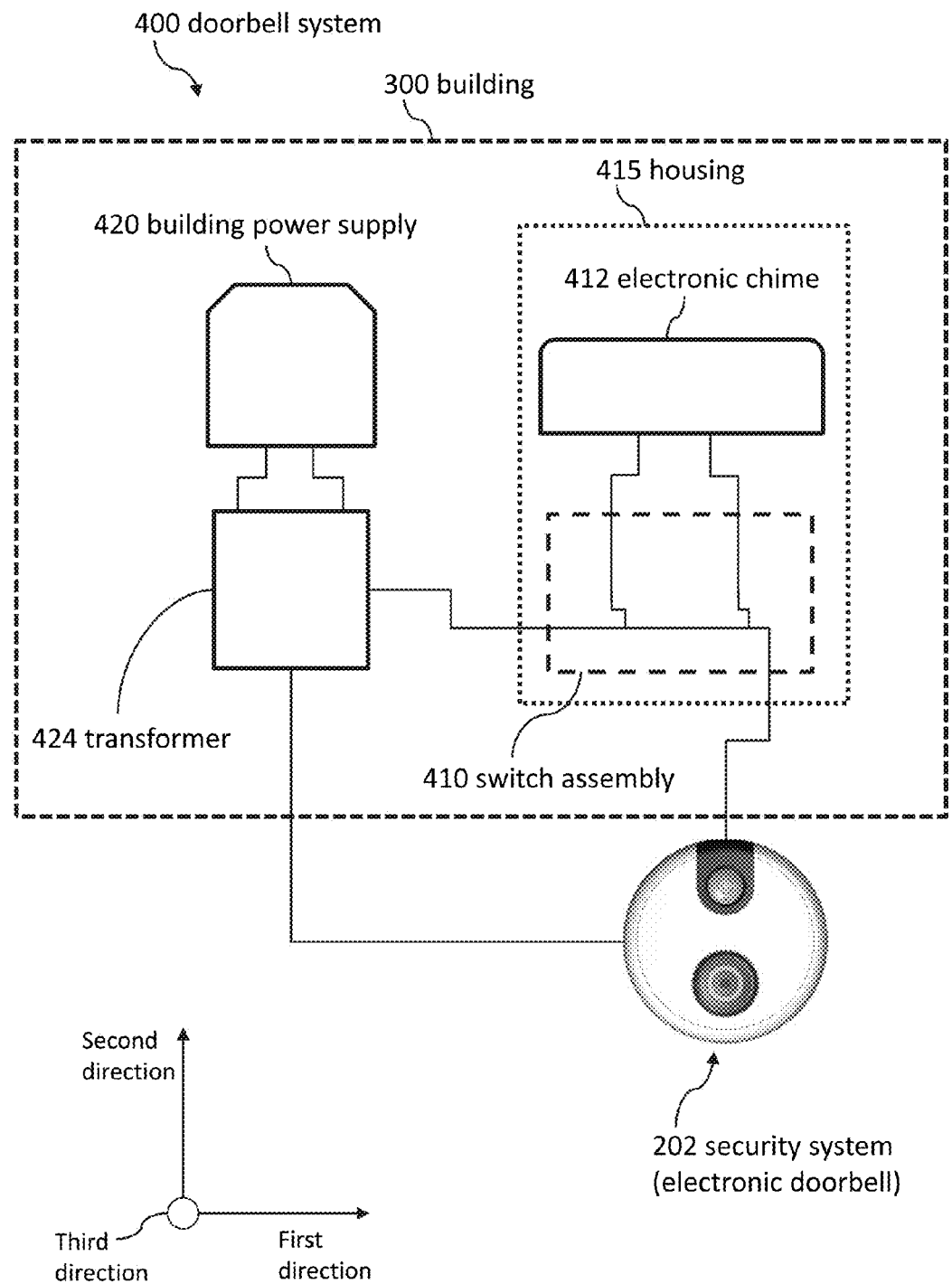
FIG. 4 illustrates a schematic view of a doorbell system, according to some embodiments.

FIG. 3 illustrates an embodiment in which a security system 202 is connected to a building 300, which can include an entryway 310 that has a door 254. A door lock 250 can be configured to lock and unlock the door 254. Electrical wires 304 can electrically couple the security system 202 to the electrical system of the building 300 so that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's Wi-Fi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202. In some embodiments, the security system 202 can communicate (e.g., wirelessly 230) with a television 306, which can be a smart television. Users can view the television 306 to see a visitor and/or talk with the visitor.

FIGS. 4-12 illustrate several embodiments of doorbell systems that include electronic switch assemblies for blocking and/or allowing electricity to enter an electronic chime 412. In the example shown in FIG. 4, the doorbell system 400 includes a security system 202 (e.g. electronic doorbell) that comprises a camera and a button. The camera may be configurable to visually detect a visitor. As well, the button may be configurable to enable the visitor to sound an electronic chime 412. In this manner, the electronic chime 412 may comprise a speaker configurable to emit a notification sound 430 in response to the visitor pressing the button of the security system 202.

The doorbell system 400 may also include an electronic switch assembly 410 electrically coupled to the security system 202 and a transformer 424. As well, the electronic chime 412 may be electrically coupled to the electronic switch assembly 410. In many embodiments, the electronic chime 412 may also be mechanically coupled to the electronic switch assembly 410.

It should be appreciated that the electronic switch assembly 410 also may be referred to as a printed circuit board. The printed circuit board may be configured to enable the electronic chime 412 to emit the notification sound 430 from the speaker based on digital music data.

With reference to FIGS. 5-6, 8-9 and 11-12 the electronic switch assembly 410 may define a first state and a second state. The first state may occur in response to a first electricity 450 that is less than a first threshold. In the first state the electronic switch assembly 410 may block the first electricity 450 from passing through the electronic chime 412 so the electronic chime 412 does not emit the notification sound 430. Stated differently, the printed circuit board may be configured to block the first electricity 450 that is less than the first threshold from entering the electronic chime 412. In this regard, the electronic switch assembly 410 may allow the first electricity 450 to pass through the electronic switch assembly 410 from the security system 202 through the electronic switch assembly 410 to the transformer 424, without entering the electronic chime 412. It should be appreciated that the first threshold may be the amount of electricity required to activate the electronic chime 412 to emit the notification sound 430.

Furthermore, the second state may occur in response to a second electricity 452 that is greater than the first threshold. In the second state the electronic switch assembly 410 may allow the second electricity 452 to pass through the electronic chime 412 so the electronic chime 412 emits the notification sound 430. In other words, the electronic switch assembly 410, or printed circuit board, may be configured to allow the second electricity 452 that is greater than the first threshold to enter the electronic chime 412. The second electricity 452 may cause the electronic chime 412 to emit the notification sound 430.

Figure 5:
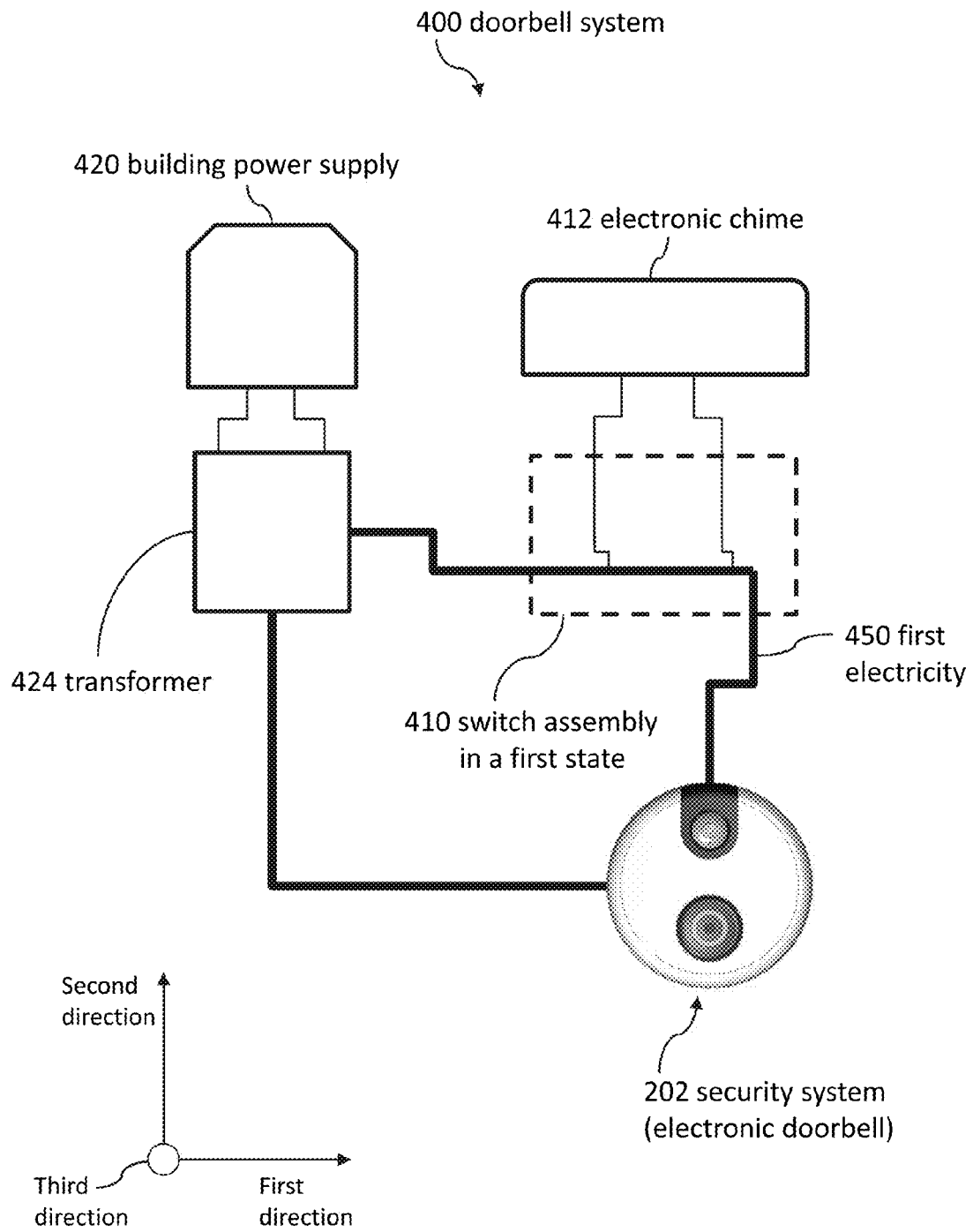
FIG. 5 illustrates a schematic view of the doorbell system from FIG. 4 with a switch assembly in a first state, according to some embodiments.
Figure 6:
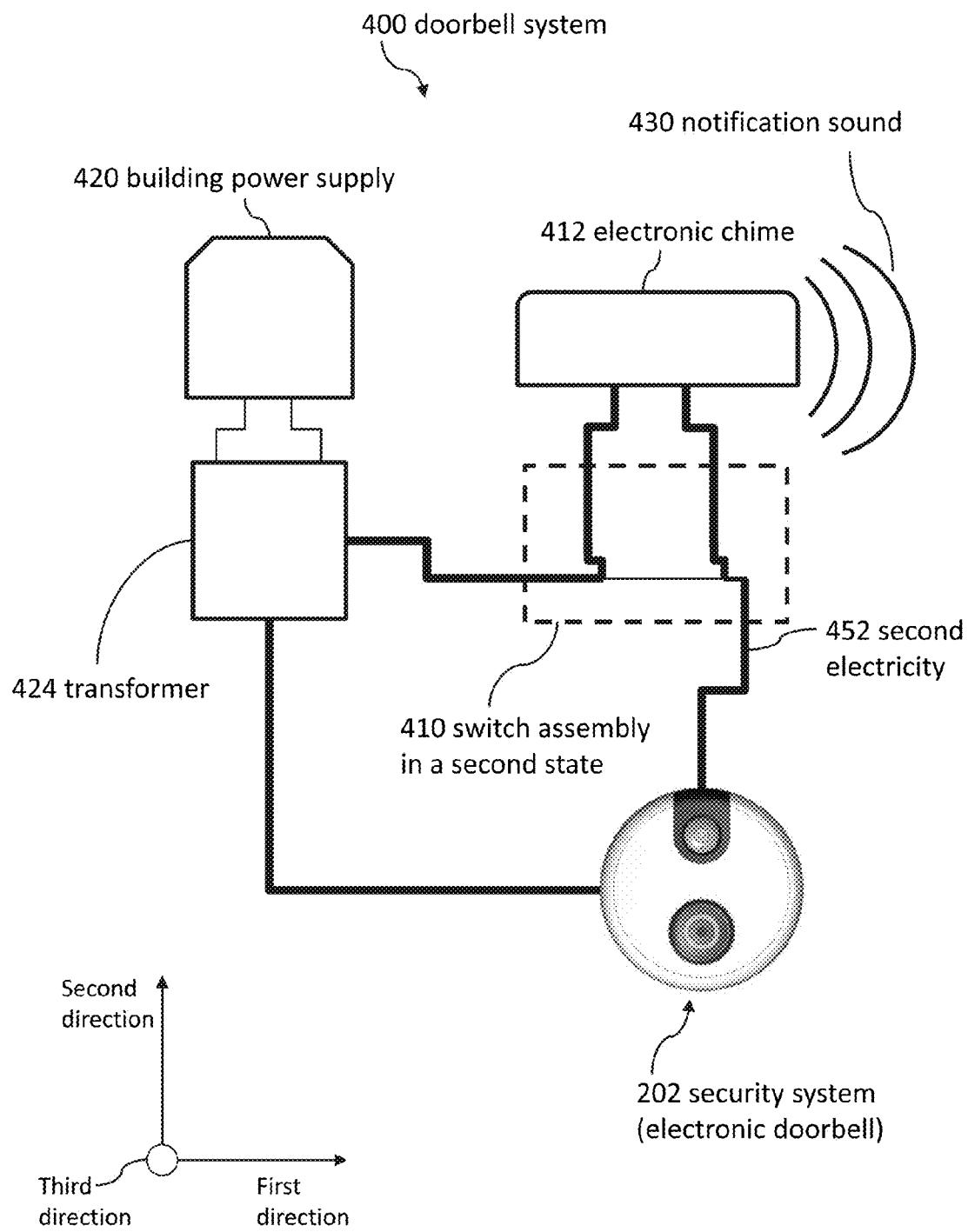
FIG. 6 illustrates a schematic view of the doorbell system from FIG. 4 with the switch assembly in a second state, according to some embodiments.

Referring now to FIG. 5, the switch assembly 410 can be placed inside a housing 415, which can also contain the electronic chime 412. The switch assembly 410 and the electronic chime 412 can be mechanically coupled to the housing 415. The housing 415 can be a plastic housing with a hollow internal portion that contains the electronic chime 412 and the switch assembly 410. At least one screw can mechanically couple the switch assembly inside the housing 415.

The electronic doorbell (e.g., the security system 202) can be located outside the housing 415. In some embodiments, the electronic doorbell is placed outside a building 300 (shown in FIG. 3) while the housing 415 is placed inside the building 300. The electronic doorbell and the housing 415 can be coupled to walls of the building 300. The electronic doorbell can be in a remote location relative to the housing 415 (e.g., the doorbell is located outside while the plastic housing 415 is located inside the building). The doorbell, the electronic chime 412, and the switch assembly 410 can all be configured to be electrically coupled to the same building power supply 420 even when the doorbell is located in the remote location relative to the housing 415.

Figure 7:
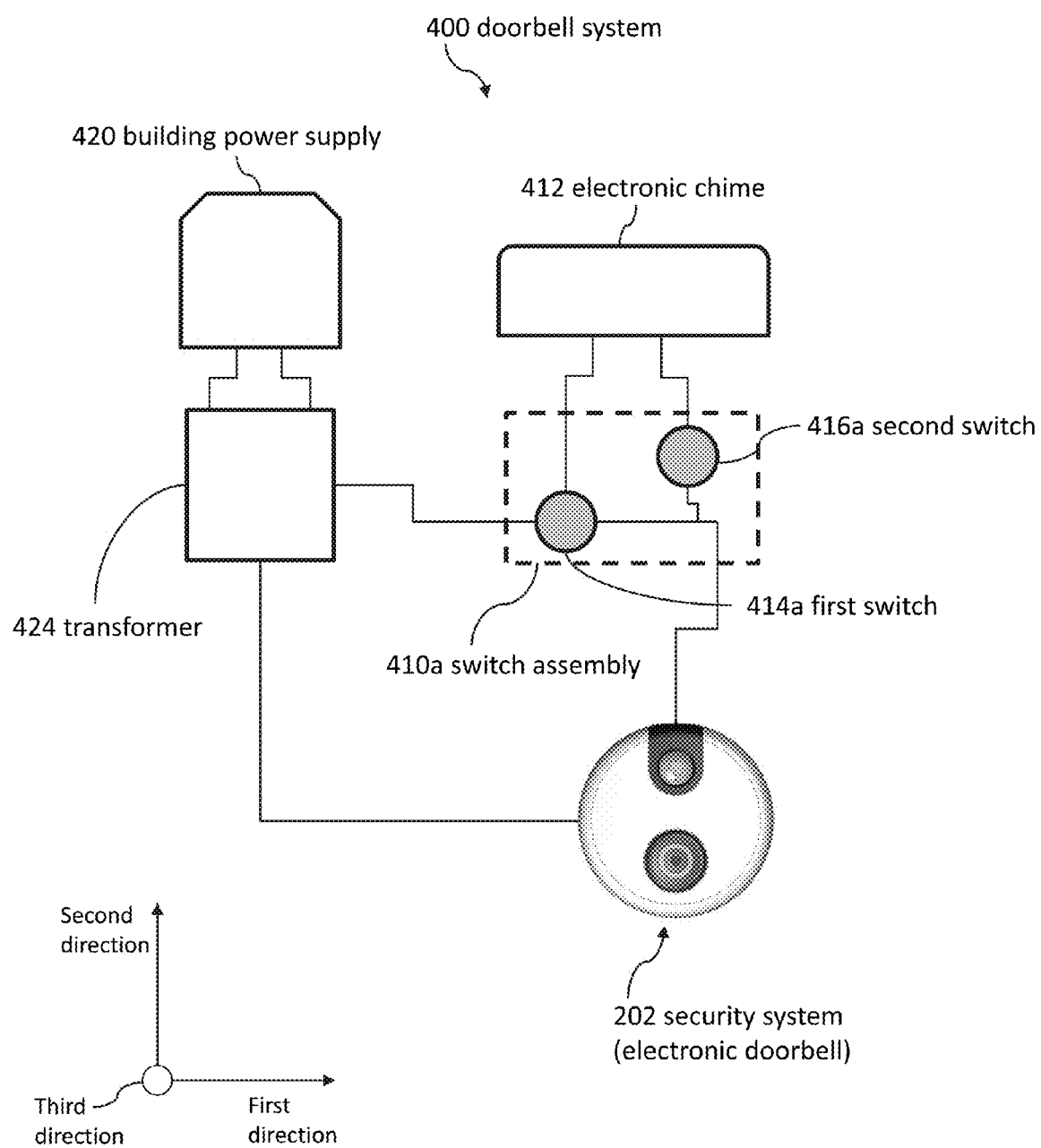
FIG. 7 illustrates a schematic view of a doorbell system, according to some embodiments.
Figure 8:
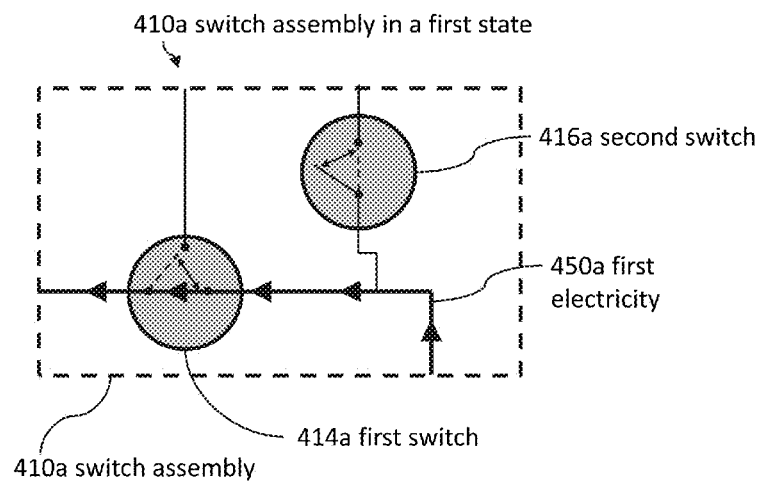
FIG. 8 illustrates a schematic view of the switch assembly from FIG. 7 with the switch assembly in a first state, according to some embodiments.
Figure 9:
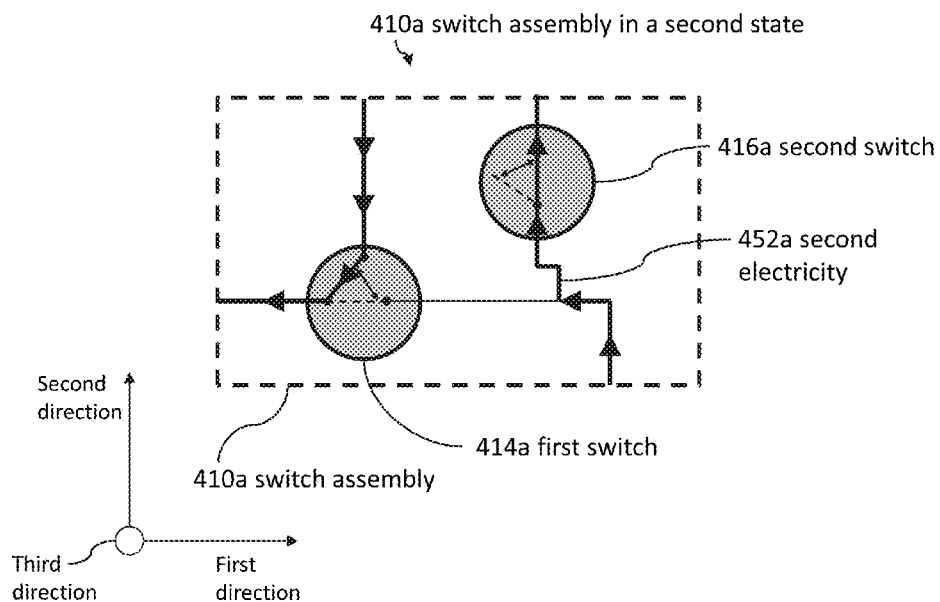
FIG. 9 illustrates a schematic view of the switch assembly from FIG. 7 with the switch assembly in a second state, according to some embodiments.

Some embodiments may implement switches to execute routing the first electricity 450 and second electricity 452. For example, as illustrated in FIGS. 7-9, the electronic switch assembly 410 may comprise a first electronic switch 414a and a second electronic switch 416a that is electrically coupled to the first electronic switch 414a. The first and second switches 414a and 416a may perform different functions in response to receiving the first electricity 450a or the second electricity 452a. For example, and as illustrated in FIG. 8, in response to the first electricity 450a, the first electronic switch 414a may allow the first electricity 450a to flow through the electronic switch assembly 410a and may not allow the first electricity 450a to flow through the electronic chime 412. As well, in response to the first electricity 450a, the second electronic switch 416a does not allow the first electricity 450a to flow through the electronic chime 412. Furthermore, as illustrated in FIG. 9, in response to the second electricity 452a, the first and second electronic switches 414a and 416a allow the second electricity 452a to flow through the electronic chime 412.

As further illustrated in FIGS. 8-9, the first and second switches 414a and 416a may be configured to implement different operations based on their respective positions. For example, as illustrated in FIG. 8, when the first electronic switch 414a is in a first position, the first electronic switch 414a may electrically connect the transformer 424 and the security system 202. Likewise, as illustrated in FIG. 9, when the first electronic switch 414a is in a second position, the first electronic switch 414a may electrically connect the transformer 424 and the electronic chime 412.

In some embodiments, the locations of the first and second switches 414a and 416a may be reversed, as such, when the first electronic switch 414a is in the second position, the first electronic switch 414a may electrically connect the electronic chime 412 and the security system 202. However, it should be appreciated that even in a reverse configuration, the first and second switches 414a and 416a may effectively achieve the same objective as that illustrated and described with respect to FIGS. 8 and 9.

With reference to FIG. 8, when the second electronic switch 416a is in an open position, the second electronic switch 416a may electrically disconnect the security system 202 and the electronic chime 412. When the second electronic switch 416a is in the open position, the second electronic switch 416a does not allow the first electricity 450a to flow to the electronic chime 412. As shown in FIG. 9, when the second electronic switch 416a is in a closed position, the second electronic switch 416a may electrically connect the security system 202 and the electronic chime 412. In this position, the second electronic switch 416a may allow the first electricity 450a to flow to the electronic chime 412. As well, in some embodiments, when the second electronic switch 416a is in the open position, the second electronic switch 416a may electrically disconnect the transformer 424 and the electronic chime 412. Accordingly, when the second electronic switch 416a is in the closed position, the second electronic switch 416a may electrically connect the transformer 424 and the electronic chime 412.

The position of the first and second switches 414a and 416a, may be dependent on the position of the other switch. For example, as shown in FIG. 8, when the first electronic switch 414a is in the first position, the second electronic switch 416a may be in the open position. Furthermore, as illustrated in FIG. 9, when the first electronic switch 414a is in the second position, the second electronic switch 416a may be in the closed position.

Figure 10:
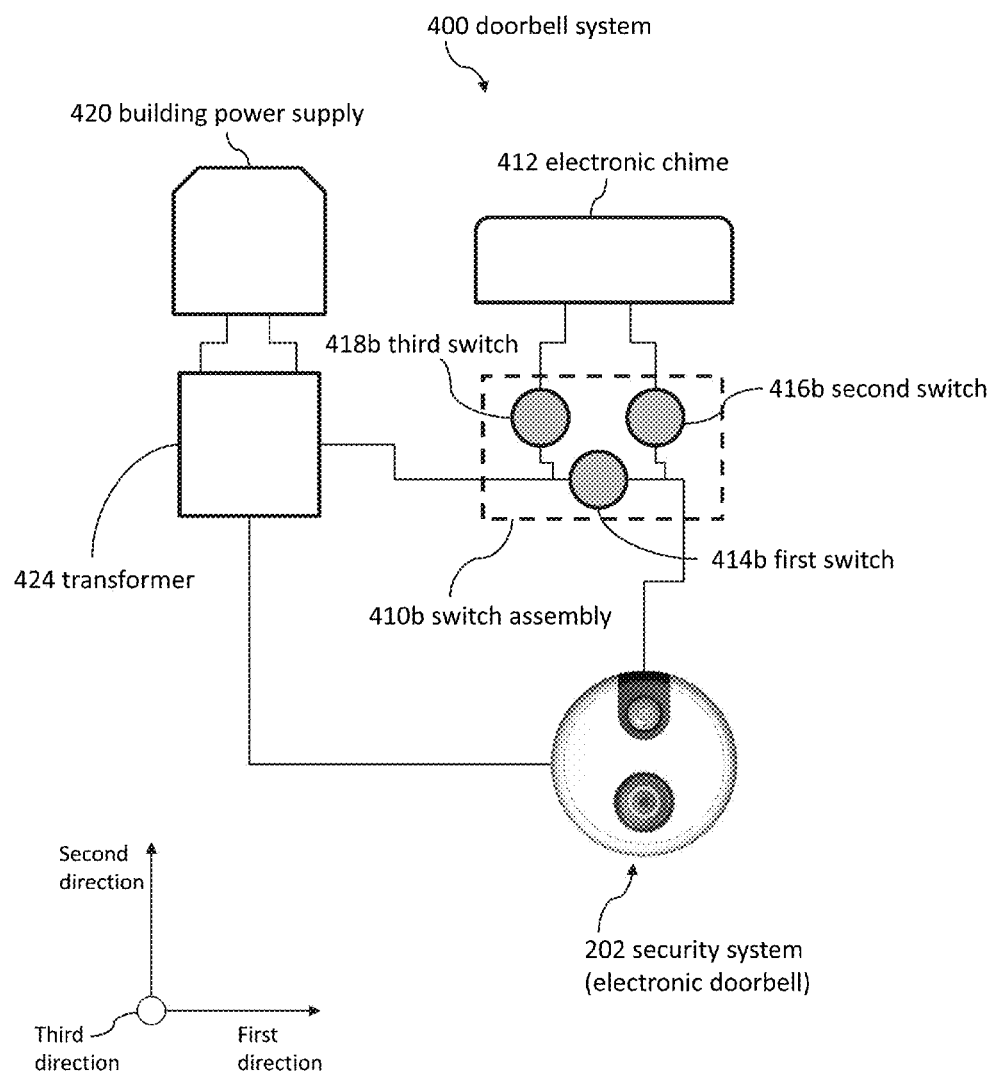
FIG. 10 illustrates a schematic view of a doorbell system, according to some embodiments.
Figure 11:
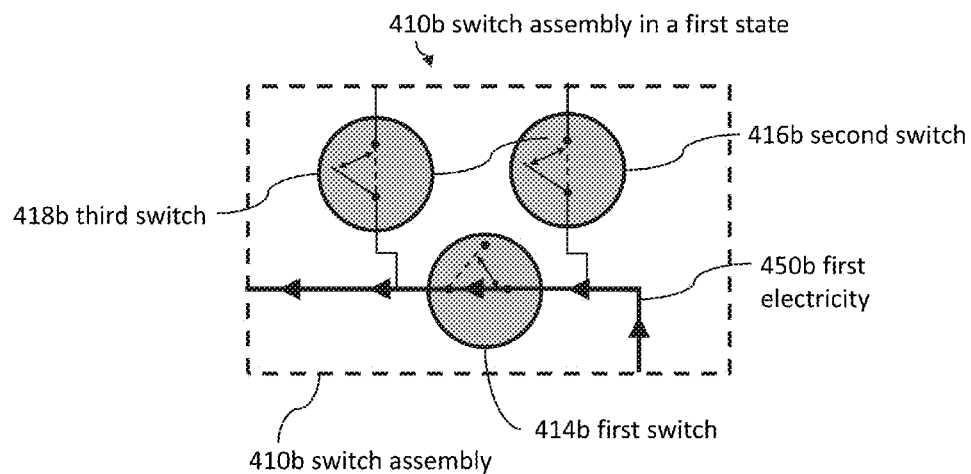
FIG. 11 illustrates a schematic view of the switch assembly from FIG. 10 with the switch assembly in a first state, according to some embodiments.

While some embodiments may implement two electronic switches, it should be appreciated that any number of electronic switches less than or greater than two may be implemented. For example, as illustrated in FIGS. 10-12, the electronic switch assembly 410b may comprise a first electronic switch 414b, a second electronic switch 416b electrically connected to the first electronic switch 414b, and a third electronic switch 418b electrically connected to the first and second electronic switches 414b and 416b.

Similar to the two-switch embodiment, the first, second and third switches 414b, 416b and 418b may move to various positions in response to receiving the first electricity 450b or the second electricity 452b. For example, with reference to FIG. 11, in response to the first electricity 450b, the first electronic switch 414b may allow the first electricity 450b to flow through the electronic switch assembly 410b and may not allow the first electricity 450b to flow to the electronic chime 412. As well, the second and third electronic switches 416b and 418b may not allow the first electricity 450b to flow to the electronic chime 412. With reference to FIG. 12, in response to the second electricity 452b, the first electronic switch 414b may not allow the second electricity 452b to flow through the electronic switch assembly 410b, and the second and third electronic switches 416b and 418b may allow the second electricity 452b to flow through the electronic chime 412.

Similar to the two-switch example as illustrated in FIGS. 7-9, the first, second and third switches 414b, 416b and 418b may be configured to implement different operations based on their respective positions. For example, as illustrated in FIG. 11, when the first electronic switch 414b is in a closed position, the first electronic switch 414b electrically connects the transformer 424 and the security system 202. Likewise, as illustrated in FIG. 12, when the first electronic switch 414b is in an open position, the first electronic switch 414b electrically disconnects the transformer 424 and the security system 202.

Figure 12:
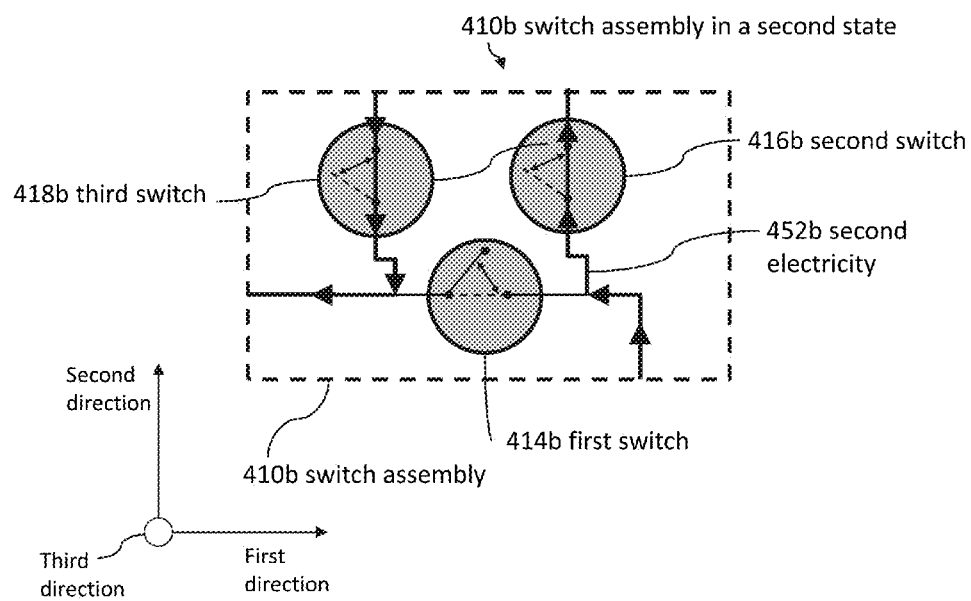
FIG. 12 illustrates a schematic view of the switch assembly from FIG. 10 with the switch assembly in a second state, according to some embodiments.

With continued reference to FIG. 12, when the second electronic switch 416b is in a closed position, the second electronic switch 416b electrically connects the transformer 424 and the electronic chime 412. Now with reference to FIG. 11, when the second electronic switch 416b is in an open position, the second electronic switch 416b electrically disconnects the transformer 424 and the electronic chime 412.

As illustrated in FIG. 12, when the third electronic switch 418b is in a closed position, the third electronic switch 418b electrically connects the security system 202 and the electronic chime 412. Furthermore, as shown in FIG. 11, when the third electronic switch 418b is in an open position, the third electronic switch 418b electrically disconnects the security system 202 and the electronic chime 412.

As well, the position of the first, second and third switches 414b, 416b and 418b, may be dependent on the position of the other switches. For example, as shown in FIG. 11, when the first electronic switch 414b is in the closed position, the second and third electronic switches 416b and 418b may each be in the open position. Furthermore, as illustrated in FIG. 12, when the first electronic switch 414b is in the open position, the second and third electronic switches 416b and 418b each may be in the closed position.

It should be appreciated that the first electronic switch 414a and the second electronic switch 416a may comprise any electrical component configured to route electricity or limit the amount of electricity flow, such as a resistor. For example, in some embodiments, such as the two-switch embodiment illustrated in FIGS. 7-9, the first electronic switch 414a may comprise a double pole, single throw switch, and the second electronic switch 416a may comprise a single pole, single throw switch. As well, in some embodiments, such as the three-switch embodiment, the first, second and third electronic switches 414b, 416b and 418b may each comprise a single pole, single throw switch.

Figure 13:
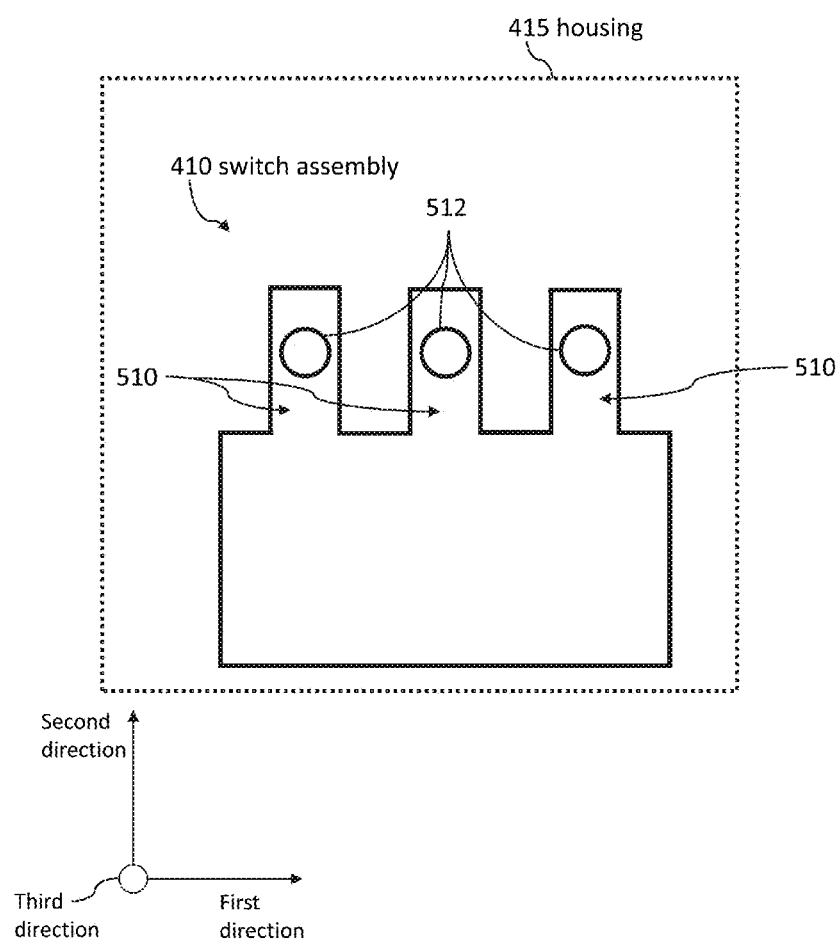
FIG. 13 illustrates an electronic switch assembly, according to some embodiments.

The electronic switch assembly 410, or the printed circuit board, may be arranged and configured in various sizes and geometries. For example, as illustrated in FIG. 13, the electronic switch assembly 410 may comprise a base portion that defines a length that extends along a first direction and a width that extends along a second direction that is opposite the first direction. In some embodiments, the electronic switch assembly 410 may define a rectangular shape, wherein the length is greater than the width. As well, in some embodiments the electronic switch assembly 410 may further include three tabs 510 that may extend from the length along the second direction. As such, electronic switch assembly 410 embodiments viewed from the top down may appear to have a footprint of a capital "E." However, it should be appreciated that the electronic switch assembly 410 may be arranged and configured to define any shape.

With continued reference to FIG. 13, each of the three tabs 510 may include an aperture 512 that extends through each of the three tabs 510 along a third direction that is opposite the first direction and the second direction. Each of the apertures 512 may be configured to receive a threaded fastener. In this manner, the electronic switch assembly 410 may be mechanically coupled to the electronic chime 412 via three threaded fasteners. In other words, each of the threaded fasteners may extend through a respective aperture 512 and mechanically engage the electronic chime 412 to mechanically couple the electronic switch assembly 410 to the electronic chime 412. It should be appreciated that electronic switch assembly 410 may include any number of apertures less than or greater than three and, accordingly, may be mechanically fastened to the electronic chime 412 via any number of mechanical fasteners, such as threaded fasteners, or the like.

In some embodiments, the doorbell system comprises a housing and the electronic chime 412 and the electronic switch assembly 410 are located inside the housing. As well, the security system 202 may be located outside the housing, in a remote location relative to the housing. For example the security system 202 may be located adjacent a doorway. However, it should be appreciated that either or both the security system 202 and the housing may be located inside or outside the building. As well, in some embodiments, the housing is a plastic housing. However, it should be appreciated that the housing may comprise any type of material configured to safely house electronic components inside or outside a building.

As well, several embodiments further include a remote computing device 204. The remote computing device can be configured to send and receive information to and from the security system 202. In several embodiments, the information may include the first threshold. For example, the remote computing device 204 may be used to adjust the level of the first threshold. For example, if the user wishes to adjust the first threshold from 12 volts to 14 volts, the user may do so by using the remote computing device 204. As well, the remote computing device 204 may be used to change the first threshold to voltage, current, power, or the like. In this regard, the switch assembly 410 may include logic circuitry so it can be programmed according to the information as established by the remote computing device 204.

As well, in several embodiments, the information may include a predetermined amount of time that the second electricity is maintained above the first threshold. In other words, the predetermined amount of time may determine the amount of time the electronic chime 412 emits the notification sound 430. For example, if the notification sound 430 is a song, the predetermined amount of time may determine the amount of time the song plays when a visitor has pressed the button of the security system 202. It should be appreciated that the predetermined amount of time may be any amount of time, such as 3 seconds, 5 seconds, 10 seconds, 30 seconds, 60 seconds, or any other amount of time.

Doorbell Method Embodiments

Figure 14:
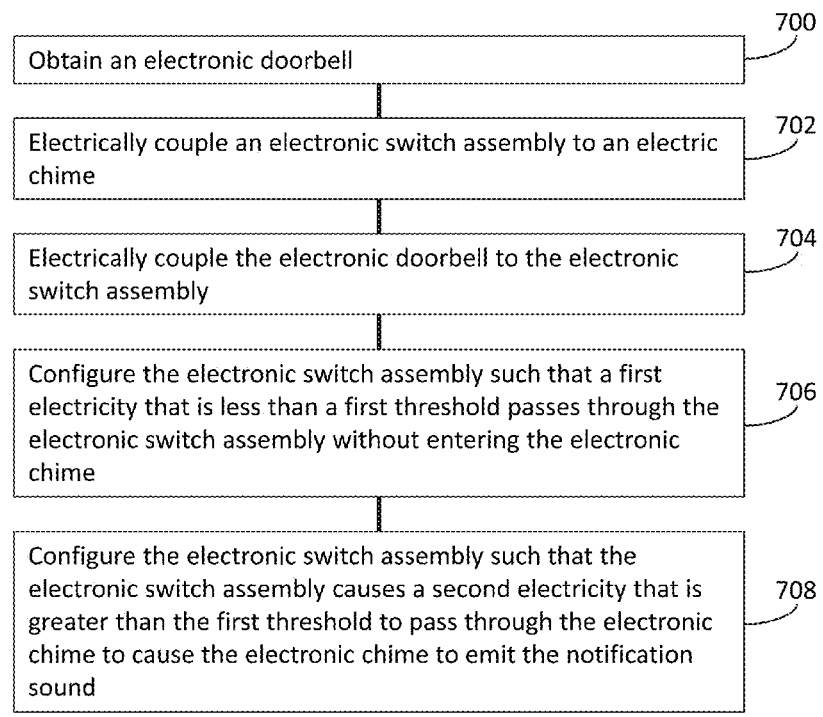
FIGS. 14-16 illustrate various methods of using doorbell systems, according to some embodiments.

Many embodiments utilize the doorbell system embodiments as previously described. For example, several embodiments include a method for using a doorbell system. The doorbell system may include an electronic doorbell, an electronic chime, and a remote computing device. As illustrated in FIG. 14, the method may include obtaining the electronic doorbell (or security system 202) that comprises a camera and a button (at step 700). The button may be configurable to enable a visitor to sound an electronic chime 412. The electronic chime 412 may include a speaker configurable to emit a notification sound 430 in response to the visitor pressing the button of the electronic doorbell 202. The method may also include electrically coupling an electronic switch assembly 410 to the electronic chime 412 (at step 702). In several embodiments, the method also may include mechanically coupling the electronic switch assembly 410 to the electronic chime 412.

Furthermore, the method may include electrically coupling the electronic doorbell 202 to the electronic switch assembly 410 (at step 704). As well, some methods may include configuring the electronic switch assembly 410 so a first electricity 450 that is less than a first threshold passes through the electronic switch assembly 410 without entering the electronic chime 412 (at step 706). In this manner, the first electricity 450 may not cause the electronic chime 412 to emit the notification sound 430. As such, in response to the first electricity being less than the first threshold, the electronic switch assembly 410 may block the first electricity 450 from passing through the electronic chime 412.

Some embodiments may further include configuring the electronic switch assembly 410 so the electronic switch assembly 410 causes a second electricity 452 that is greater than the first threshold to pass through the electronic chime 412 (at step 708). In this manner, the second electricity 452 may cause the electronic chime 412 to emit the notification sound 430. The electronic switch assembly 410 may be configured to allow the second electricity 452 to pass through the electronic chime 412 in response to the second electricity 452 being greater than the first threshold. It should be appreciated that the first threshold may be an electricity value that is required by the electronic chime 412 in order to emit the notification sound 430.

It should be appreciated that embodiments described in this disclosure are not limited to the first and second electricity 450 and 452. For example, several embodiments may further include a third and a fourth electricity. Some embodiments include configuring an electrical circuit, such as the doorbell system 400, so that the third electricity passes from the transformer 424 to the security system 202, and to the electronic switch assembly 410, and then to the transformer 424 without entering the electronic chime 412 in response to the third electricity being less than the first threshold. As well, several embodiments include configuring the electrical circuit so that a fourth electricity passes from the transformer 424 to the security system 202 and to the electronic switch assembly 410 in response to the fourth electricity being greater than the first threshold. In this manner, the fourth electricity may be diverted from the electronic switch assembly 410 into the electronic chime 412, and then back into the electronic switch assembly 410. It should be appreciated that the security system 202 and the electronic switch assembly 410 may be connected in series in the electrical circuit. However, it should also be appreciated that the security system 202 and the electronic switch assembly 410 may be connected in parallel.

The electronic chime 412 may comprise any type of digital device configured to emit a notification sound 430 in response to the visitor pressing the button of the security system 202. For example, the electronic chime 412 may have a first printed circuit board. In several embodiments, the method may further include configuring the first printed circuit board to enable the electronic chime 412 to emit the notification sound 430 from the speaker based on digital music data.

In several embodiments, when the visitor presses the button of the security system 202, the security system 202 may be configured to route all electricity to the electronic chime 412 via the electronic switch assembly 410. To accomplish this, the security system 202 may further comprise a second printed circuit board. In some embodiments, the method may further include routing at least a portion of the first electricity 450 through the second printed circuit board of the security system 202. In response to the visitor pressing the button, the method may further include blocking the second electricity 452 from entering the second printed circuit board of the security system. In order to cause the electronic chime 412 to emit the notification sound 430, the method may include causing the second electricity 452 to be greater than the first threshold in response to the visitor pressing the button of the security system 202.

The doorbell system 400, via the electronic switch assembly 410, also may be configured to block the first electricity 450 from entering the electronic chime 412 when the first electricity 450 is less than the first threshold. Specifically, in several embodiments, the method may include using the electronic switch assembly 410 to block transformer electrical power from entering the electronic chime 412 while the first electricity 450 is less than the first threshold. As well, the method may include using the electronic switch assembly 410 to divert the transformer electrical power from the electronic switch assembly 410 into the electronic chime 412 while the second electricity 452 is greater than the first threshold.

It should be appreciated that the first threshold may be any type of electricity, such as power, voltage, and/or current. In this regard the first threshold may be described as a first electrical power threshold, a first electrical voltage threshold, and/or a first electrical current threshold.

The doorbell system 400 may also include the remote computing device 204, which can be used to send and receive information to and/or from the security system 202. For example, the information may include a predetermined amount of time that defines the duration of time the electronic chime 412 emits the notification sound 430. In this regard, some embodiments may further include setting the predetermined amount of time via the remote computing device 204 prior to the second electricity 452 exceeding the first threshold. As well, the method may include sending the predetermined amount of time wirelessly from the remote computing device 204 to the security system 202. And once the second electricity 452 is greater than the first threshold, the method may further include maintaining the second electricity 452 above the first threshold for the predetermined amount of time.

In some embodiments, the doorbell system 400 comprises a housing, such as a plastic housing. Accordingly, the method may further include placing the electronic chime 412 and the electronic switch assembly 410 inside the plastic housing. As well, the method may include placing the security system 202 outside the plastic housing and in a remote location relative to the plastic housing. Some methods may further include mounting the plastic housing along an interior surface of the building and mounting the security system 202 along an exterior surface of the building near an entry point of the building. However, it should be appreciated that the plastic housing and/or the security system 202 may be mounted anywhere along an interior or exterior surface of the building.

Figure 15:
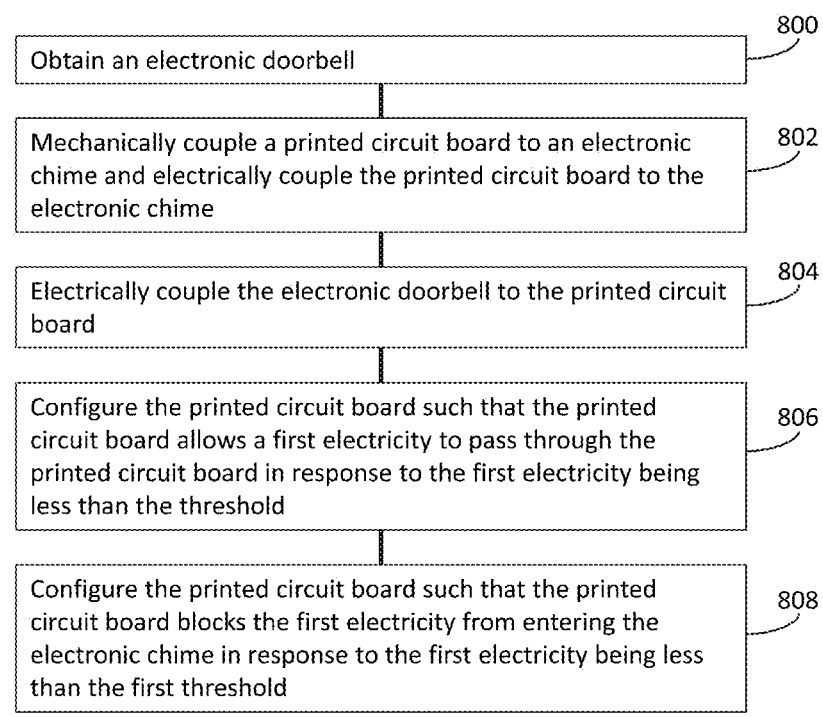

As illustrated in FIG. 15, some embodiments disclose another method for using the doorbell system 400. The method may include obtaining the security system 202 (at step 800). The method may also include mechanically coupling a printed circuit board 410 to the electronic chime 412 and electrically coupling the printed circuit board 410 to the electronic chime 412 (at step 802). As well, some methods include electrically coupling the security system 202 to the printed circuit board 410 (at step 804).

Several embodiments may include configuring the printed circuit board 410 so the printed circuit board 410 allows a first electricity 450 to pass through the printed circuit board 410 in response to the first electricity 450 being less than the first threshold (at step 806). As well, the method may include configuring the printed circuit board 410 so the printed circuit board 410 blocks the first electricity 450 from entering the electronic chime 412 in response to the first electricity 450 being less than the first threshold (at step 808). Accordingly, the first electricity 450 does not cause the electronic chime 412 to emit the notification sound 430.

Several embodiments may further include configuring the printed circuit board 410 so the printed circuit board 410 causes a second electricity 452 that is greater than the first threshold to enter the electronic chime 412 to cause the electronic chime to emit the notification sound 430. As such, the printed circuit board 410 may cause the second electricity 452 to pass through the electronic chime 412 in response to the second electricity 452 being greater than the first threshold.

Furthermore, the printed circuit board 410 may be described as a first printed circuit board, and the security system 202 may comprise a second printed circuit board. Similar to the method illustrated in FIG. 14, the method disclosed in FIG. 15 may further include routing at least a portion of the first electricity 450 through the second printed circuit board of the security system 202. As well, this method may further include configuring the second printed circuit board to block the second electricity 452 from entering the second printed circuit board of the security system 202 in response to the visitor pressing the button. Stated differently, these steps may allow all the transformer electrical power to be blocked from entering the security system 202 and diverted to the electronic chime 412 so the chime may have enough electrical power to emit the notification sound 430.

Figure 16:
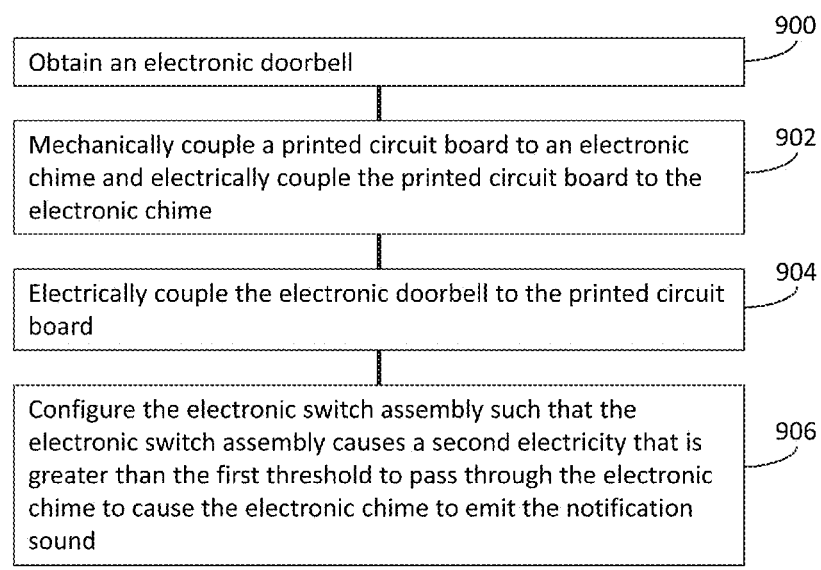

Several embodiments include yet another method for using the doorbell system 400. As illustrated in FIG. 16, some methods include obtaining the security system 202 (at step 900). Similar to the methods illustrated in FIG. 14, many embodiments also include mechanically coupling the printed circuit board 410 to the electronic chime 412 and electrically coupling the printed circuit board 410 to the electronic chime 412 (at step 902). As well, several embodiments include electrically coupling the security system 202 to the printed circuit board 410 (at step 904). With continued reference to FIG. 15, in response to the second electricity 452 being greater than the first threshold, many embodiments also include configuring the electronic switch assembly 410 so the electronic switch assembly 410 causes the second electricity 452 to pass through the electronic chime 412 to cause the electronic chime 412 to emit the notification sound 430 (at step 906).

Chime Compatibility Diagnostics

In some cases, electronic doorbells may not be compatible with certain types of chimes. Some types of electronic chimes can be particularly problematic. For example, installing an electronic doorbell on a circuit that includes an electronic chime can cause the electronic chime to constantly ring (rather than just ring when the user "presses" the button). Constant ringing can be extremely bothersome to users.

Several doorbell embodiments include means of detecting whether the doorbell is electrically coupled to a chime that is incompatible with the doorbell (e.g., would cause constant and/or inappropriate ringing or buzzing). Once the doorbell detects that it is electrically coupled to an incompatible chime, then the doorbell can send a notification to a user (e.g., the person installing the doorbell). The notification can instruct the user to either replace the electronic chime with a mechanical chime or to use a chime adapter (e.g., any of the switch assemblies described herein).

The notification can be sent wirelessly to the remote computing device (e.g., as a push notification that appears on the user's smartphone). The notification can also be a light or a sound emitted from the doorbell. An instruction manual can help the user interpret the light or sound as indicating that the chime is incompatible and/or that a chime adapter is recommended. In some embodiments, the sound includes words. For example, the doorbell can "talk" to the user to instruct the user about the chime compatibility warning.

Figure 17:
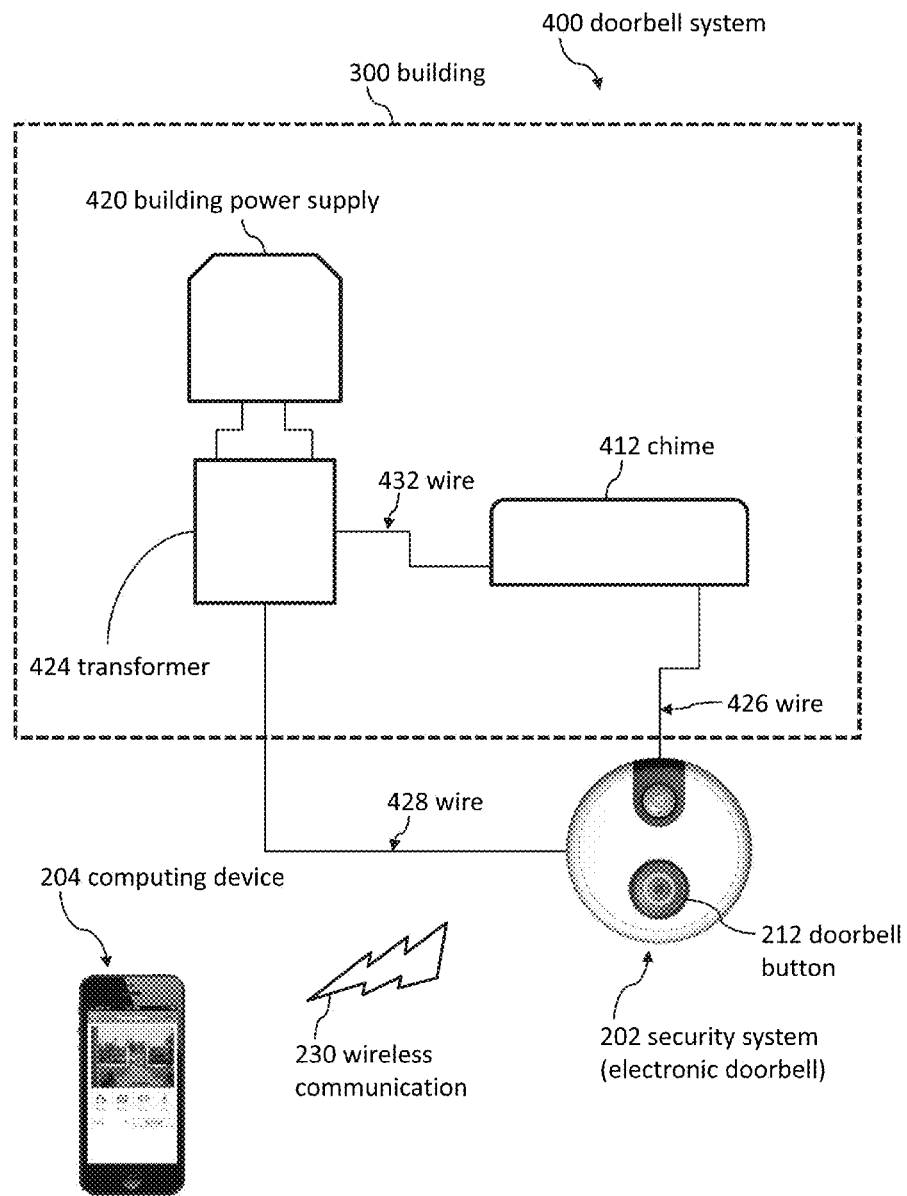
FIGS. 17-20 illustrate schematic views of doorbell systems, according to some embodiments

FIG. 17 illustrates a doorbell 202 that is electrically coupled to an external chime 412 and to an external power supply (e.g., the transformer 424 and/or the building's power supply 420). The doorbell 202 can measure the load signature of the external chime 412 via wires 426, 428 that electrically couple the doorbell 202 to the chime 412. The doorbell 202 can determine if the load signature of the chime 412 is indicative of the chime 412 being incompatible with the doorbell 202.

The doorbell 202 is configured to wirelessly communicate 230 with a remote computing device 204 (e.g., a smartphone or a laptop). The external chime 412, which is external relative to the doorbell 202, can be located inside the building 300. In some embodiments, the external chime 412 is located outside the building 300. The doorbell 202 can include a button 212 that is configurable to enable a visitor to sound the external chime 412. The button 212 is coupled to the outer housing 224 of the doorbell 202 (labeled in FIG. 1).

Figure 18:
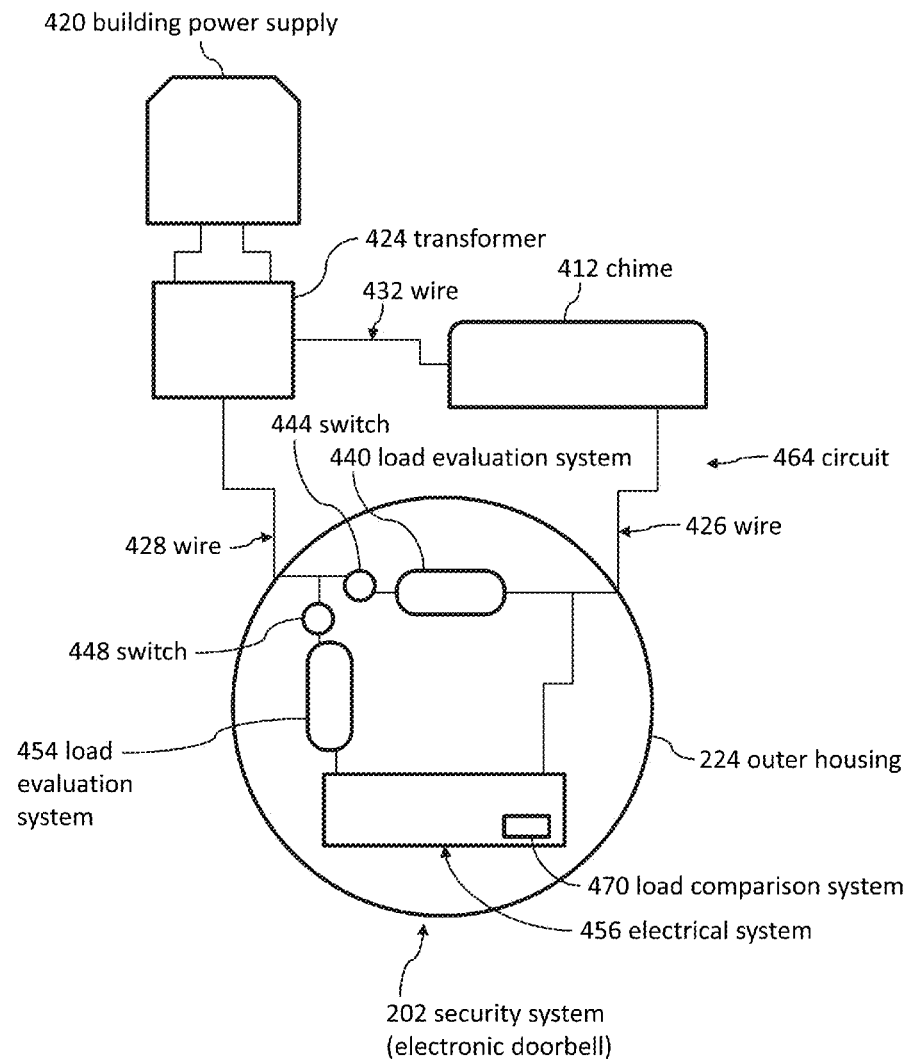

FIG. 18 illustrates a schematic view of various items shown in FIG. 17. The chime 412 is located externally relative to the doorbell 202. Wires 426, 428, 432 create a circuit that includes the doorbell 202, the chime 412, and an external power supply (e.g., the transformer 424 and/or the building power supply 420). A first load evaluation system 440 is coupled to the outer housing 224 of the doorbell 202.

The first load evaluation system 440 is configured to evaluate a first load signature of the external chime 412. A first switch 444 can control the flow of electricity through the first load evaluation system 444. A second switch 448 can control the flow of electricity through a second load evaluation system 454 and into an electrical system 456 of the doorbell 202. (The electrical system 456 is often larger than shown in FIG. 19.)

Figure 19:
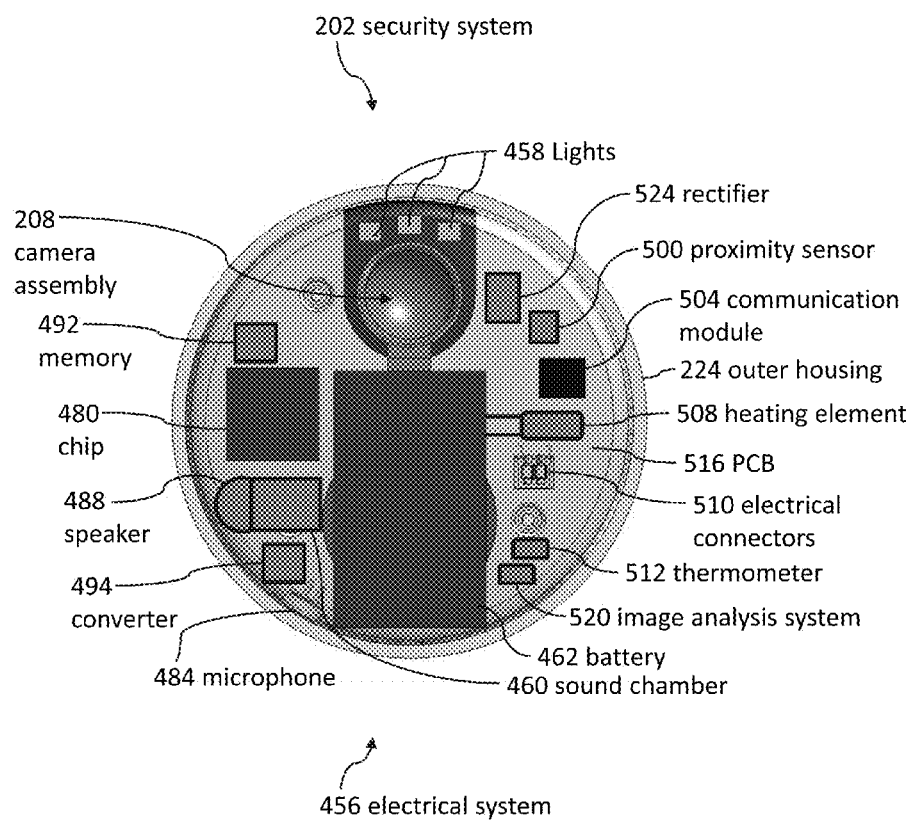

FIG. 19 illustrates an internal view of the doorbell 202. Security systems 202 can include a chip 480 (e.g., integrated circuits, microprocessor, computer) and a memory 492. Security systems 202 can also include a microphone 484 and a speaker 488. The speaker 488 can comprise a flat speaker and a sound chamber 460 configured to amplify an emitted sound. The flat speaker can be located in the sound chamber. Some security system embodiments include a proximity sensor 500. In several embodiments, security systems 202 include a wireless communication module 504, such as a WiFi module. The communication module 504 can have an integrated antenna. In some embodiments, an antenna is contained within the outer housing 224.

The security system 202 can include one or more heating elements 508 configured to regulate the temperature of the security system 202. For example, security systems 202 can be used in very cold environments, such as in Alaska. The heating element 508 can be used in various methods to protect temperature sensitive portions of the security system 202 from cold weather.

While protecting the security system 202 from cold weather can be important in some embodiments, protecting visitors from excessive heat can also be important in some embodiments. Excessive heat could burn visitors as they "ring" the doorbell (e.g., press the doorbell button 212 shown in FIG. 10). The security system 202 can include a thermometer 512 to enable the system to determine the temperature inside a portion of the security system 202 and/or outside the security system 202.

Several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the security system 202. The power conversion can convert between AC and DC, change the voltage, and/or change the frequency. The converter 494 can include a transformer and/or a voltage regulator. In several embodiments, the converter 494 can include a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, the rectifier 524, the proximity sensor 500, the communication module 504, the heating element 508, the electrical connectors 510, the thermometer 512, the image analysis system 520, and the battery 642) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

Referring now to FIG. 18, opening the second switch 448 and closing the first switch 444 can enable the first load evaluation system 440 to measure the first load signature of the external chime 412. By opening the second switch 448, the system can clearly evaluate the first load signature of the external chime 412 by reducing or even eliminating the effect of the electrical system 456 on the measurement of the first load signature.

If the chime 412 is a mechanical chime, then the first load signature can show a resistance as electricity passes through the chime 412. An electromagnet used to drive a solenoid to strike a metal resonator typically has resistance to electrical flow. This resistance typically has low variability. In contrast, if the chime 412 is an electronic chime, then the first load signature will typically look very different than the load signature of a mechanical chime. For example, the waveform and magnitude of the load signature is typically different for an electronic chime than for a mechanical chime. The doorbell 202 can analyze the power load signature, the current load signature, and/or the voltage load signature. In many embodiments, the doorbell 202 analyzes more than one of the power load signature, the current load signature, and the voltage load signature of the chime 412.

In some embodiments, the doorbell 202 identifies the chime as being an incompatible chime if the variability of the first load signature has a variability that is above a threshold and/or if the power consumed by the chime is above a threshold.

In several embodiments, the first load evaluation system 440 is configured to detect a variable power load. The doorbell 202 can be configured to send the first notification in response to detecting that the external chime 412 comprises the variable power load within a predetermined range. In some embodiments, the range is configured such that variability above a certain threshold indicates that the chime 412 is incompatible.

In some embodiments, the first load evaluation system 440 is configured to detect a constant power load. The doorbell 202 can be configured to not send the first notification in response to detecting that the external chime 412 comprises the constant power load. For example, a mechanical chime can have a much more constant power load than an electronic chime when a visitor is not pressing the doorbell button.

In several embodiments, the first load evaluation system 440 is configured to detect a waveform of the first load signature. The doorbell 202 can be configured to send the first notification in response to determining that the waveform of the first load signature meets at least one predetermined requirement. The predetermined requirement can be a waveform indicative of an electronic chime, a microprocessor, and/or of a printed circuit board with electronic components.

In some embodiments, the first load evaluation system 440 is configured to detect a magnitude of the first load signature. The doorbell 202 can be configured to send the first notification in response to determining that the magnitude of the first load signature meets at least one predetermined requirement. The predetermined requirement can be a magnitude that is greater than a predetermined threshold (e.g., indicative of the electronic chime consuming electrical power).

In some embodiments, the doorbell 202 measures the first load signature during a period when a visitor is not pressing the button 212 of the doorbell 202 (see FIG. 17). Thus, the first load signature can reflect behavior when the chime 412 is not activated (e.g., is not "ringing").

Referring now to FIG. 19, if the doorbell 202 detects that the first load signature is indicative of the external chime being incompatible (e.g., the external chime is an electronic chime rather than a mechanical chime), then the doorbell 202 can emit a notification sound (e.g., from the speaker 488), a visible notification light (e.g., from the lights 458), and/or a wireless notification that is sent to the remote computing device 204 (shown in FIG. 17). The doorbell 202 can send a first notification to the remote computing device 204 via a wireless network 308 (shown in FIG. 3), a server 206 (shown in FIG. 1), cellular networks, and/or the Internet. The first notification can include information related to obtaining a chime adapter. For example, the first notification can instruct a user that she needs a chime adapter and/or can instruct a user how to buy a chime adapter. The first notification can offer to sell the user a chime adapter. The first notification can be a push notification that leads to a website with an offer to sell a chime adapter. The first notification can be a push notification that leads to an app that offers to sell a chime adapter.

Many different types of chime adapters (e.g., switch assemblies) are described herein in the context of FIGS. 4-16. Other types of chime adapters may also be used to make an electronic chime compatible with the doorbell 202.

In several embodiments, the chime adapter is configured such that a first electricity that is less than a first threshold passes through the chime adapter so the first electricity does not cause the external chime to emit a summon sound, and the chime adapter is configured such that a second electricity that is greater than a second threshold causes the external chime to emit the summon sound.

Figure 20:
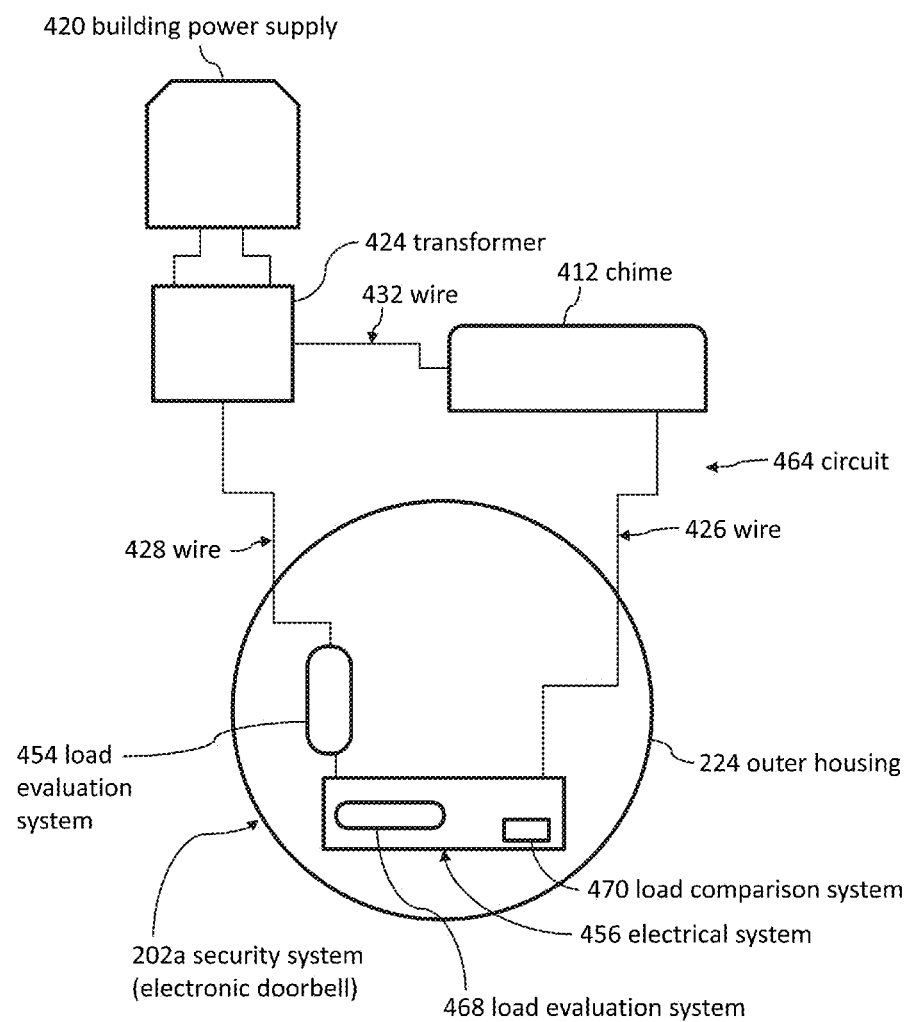

FIG. 20 illustrates an embodiment in which a third load evaluation system 468 is configured to detect a second load signature of the doorbell 202. The third evaluation system 468 can be integrated into the electrical system 456 of the doorbell 202a. The doorbell 202a is configured to determine whether the first load signature of the external chime 412 is indicative of the chime 412 being an electronic chime by analyzing a circuit 464 that comprises the doorbell 202 and the external chime 412 with the second load evaluation system 454. The circuit 464 has a third load signature.

Analyzing the circuit 464 can comprise reducing at least one effect of the second load signature of the doorbell 202a on the third load signature of the circuit 464 to evaluate the first load signature of the chime 412. For example, the second load signature can be "subtracted" from the third load signature to estimate the first load signature.

The third load signature (detected by the second load evaluation system 454) can be influenced by the electrical system 456 and the chime 412. Reducing or eliminating the influence of the electrical system 456 of the doorbell 202a on the third load signature can enable the system to more accurately analyze the first load signature of the chime 412. The third load evaluation system 468 can analyze the second load signature of the electrical system 456 of the doorbell 202a. Then, the effect of the second load signature (of the doorbell 202a) on the third load signature (of the circuit 464) can be reduced or eliminated to estimate the first load signature of the chime 412. The doorbell 202a can analyze the estimated first load signature of the chime 412 to determine whether the first load signature is indicative of the first external chime 412 being incompatible with the doorbell 202a.

Evaluating the first load signature of the external chime 412 can comprise: evaluating a second load signature of the doorbell 202a; evaluating a third load signature of a circuit 464 that comprises the doorbell 202a, the external power supply, and the external chime 412; and reducing at least one effect of the second load signature on the third load signature to estimate the first load signature.

The electrical system 456 of the doorbell 202a can include a load comparison system 470 configured to measure electrical traits of the circuit 464. The circuit 464 includes the doorbell 202a and the external chime 412. The load comparison system 470 is configured to evaluate the first load signature by reducing at least one effect of the second load signature on the electrical traits of the circuit 464. The load comparison system 470 can also be a load evaluation system.

Referring now to FIGS. 17-20, embodiments can include using a doorbell 202, 202a configured to wirelessly communicate with a remote computing device 204. Methods can include electrically coupling the doorbell 202, 202a to an external power supply (e.g., a transformer 424 and/or a building's power supply 420), and to a first external chime 412. Methods can include evaluating the first load signature of the first external chime 412 with the doorbell 202, 202a; and emitting a first notification from the doorbell 202, 202a in response to the first load signature being indicative of the first external chime 412 being incompatible with the doorbell 202, 202a.

In response to the first notification, some embodiments include replacing the first external chime 412 with a second external chime. In response to the first notification, several embodiments include creating a circuit 464 that comprises the doorbell 202, 202a, the external power supply (e.g., power from the building 300 as shown in FIG. 3), and a chime adapter (e.g., a switch assembly 410, 410a, 410b shown in FIGS. 4-12), and electrically coupling the chime adapter to the first external chime 412.

Several embodiments include coupling the chime adapter (e.g., a switch assembly) to the first external chime 412 such that a first electricity that is less than a first threshold passes through the chime adapter and bypasses at least a portion of the first external chime 412 such that the first electricity does not cause the first external chime 412 to emit a summon sound, and coupling the chime adapter to the first external chime 412 such that a second electricity that is greater than a second threshold passes through the portion of the first external chime 412 and causes the first external chime 412 to emit the summon sound (e.g., a "ding-dong" sound or another sound configured to summon a building occupant).

The remote computing device 204 can receive the first notification (e.g., can receive a wireless alert based on data from the doorbell 202, 202a). In some embodiments, the first notification is not sent to the remote computing device 204. Emitting the first notification can comprise emitting a sound and/or a light from the doorbell 202, 202a in response to the first external chime 412 being incompatible with the doorbell 202, 202a.

In some embodiments, a wireless communication system (e.g., the communication module 504 shown in FIG. 19) is configured to send a first notification to the remote computing device in response to a load signature being indicative of the external chime being incompatible with the doorbell. The first notification can include information related to chime compatibility. For example, the notification can say, "Your chime is not compatible with your doorbell. Please buy a new chime or buy a chime adapter." The notification can also include a link to buy a new chime or a chime adapter.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A doorbell configured to wirelessly communicate with a remote computing device, wherein the doorbell is configured to be electrically coupled to an external power supply and to an external chime, the doorbell comprising:
    an outer housing;
    a button coupled to the outer housing, wherein the button is configurable to enable a visitor to sound the external chime;
    a first load evaluation system configured to evaluate a first load signature of the external chime; and
    a first notification sent to the remote computing device in response to the first load signature being indicative of the external chime being an electronic chime rather than a mechanical chime.

2. The doorbell of claim 1, wherein the first notification includes information related to obtaining a chime adapter.

3. The doorbell of claim 2, wherein the chime adapter is configured such that a first electricity that is less than a first threshold passes through the chime adapter such that the first electricity does not cause the external chime to emit a summon sound, and the chime adapter is configured such that a second electricity that is greater than a second threshold causes the external chime to emit the summon sound.

4. The doorbell of claim 1, further comprising an outer housing, wherein the button and the first load evaluation system are coupled to the outer housing.

5. The doorbell of claim 1, wherein the first load signature is a first power signature.

6. The doorbell of claim 1, wherein the first load signature is a first current signature.

7. The doorbell of claim 1, wherein the first load signature is a first voltage signature.

8. The doorbell of claim 1, wherein the first load evaluation system is configured to detect a variable power load, and the doorbell is configured to send the first notification in response to detecting that the external chime comprises the variable power load within a predetermined range.

9. The doorbell of claim 8, wherein the first load evaluation system is configured to detect a constant power load, and the doorbell is configured to not send the first notification in response to detecting that the external chime comprises the constant power load.

10. The doorbell of claim 1, wherein the first load evaluation system is configured to detect a waveform of the first load signature, and the doorbell is configured to send the first notification in response to determining that the waveform of the first load signature meets at least one predetermined requirement.

11. The doorbell of claim 1, wherein the first load evaluation system is configured to detect a magnitude of the first load signature, and the doorbell is configured to send the first notification in response to determining that the magnitude of the first load signature meets at least one predetermined requirement.

12. The doorbell of claim 1, further comprising a second load evaluation system configured to detect a second load signature of the doorbell, wherein the doorbell is configured to determine that the first load signature is indicative of the external chime being the electronic chime by analyzing a circuit that comprises the doorbell and the external chime.

13. The doorbell of claim 12, wherein the circuit comprises a third load signature, and analyzing the circuit comprises reducing at least one effect of the second load signature on the third load signature to evaluate the first load signature.

14. The doorbell of claim 1, further comprising a second load evaluation system configured to detect a second load signature of the doorbell, and further comprising a load comparison system configured to measure electrical traits of a circuit that comprises the doorbell and the external chime, wherein the load comparison system is configured to evaluate the first load signature by reducing at least one effect of the second load signature on the electrical traits of the circuit.

15. A doorbell configured to wirelessly communicate with a remote computing device, wherein the doorbell is configured to be electrically coupled to an external power supply and to an external chime, the doorbell comprising:
an outer housing;
a camera coupled to the outer housing;
a first load measurement system coupled to the outer housing, the first load measurement system configured to measure a first load signature of a circuit that comprises the doorbell and the external chime;
a second load measurement system coupled to the outer housing, the second load measurement system configured to measure a second load signature of the doorbell; and
a load evaluation system coupled to the outer housing, the load evaluation system configured to reduce an electrical effect of the second load signature on the first load signature to enable the doorbell to evaluate a third load signature of the external chime.

16. The doorbell of claim 15, further comprising a wireless communication system configured to send a first notification to the remote computing device in response to the third load signature being indicative of the external chime being incompatible with the doorbell.

17. The doorbell of claim 16, wherein the first notification includes information related to chime compatibility.

18. The doorbell of claim 15, further comprising a wireless communication system configured to send a first notification to the remote computing device in response to the third load signature being indicative of the external chime being an electronic chime rather than a mechanical chime.

19. The doorbell of claim 18, wherein the first notification includes information related to obtaining a chime adapter.

20. The doorbell of claim 15, further comprising an outer housing, wherein the first 13 load measurement system, the second load measurement system, and the load evaluation system are located inside the outer housing of the doorbell.

21. The doorbell of claim 15, wherein the first load signature comprises a first power signature.

22. A method for using a doorbell configured to wirelessly communicate with a remote computing device, wherein the doorbell is configured to detect a visitor, the method comprising:
coupling electrically the doorbell to an external power supply and to a first external chime, wherein the first external chime comprises a first load signature;
evaluating the first load signature of the first external chime with the doorbell; and
emitting a first notification from the doorbell in response to the first load signature being indicative of the first external chime being incompatible with the doorbell.

23. The method of claim 22, further comprising, in response to the first notification, replacing the first external chime with a second external chime.

24. The method of claim 22, further comprising, in response to the first notification, creating a circuit that comprises the doorbell, the external power supply, and a chime adapter, and electrically coupling the chime adapter to the first external chime.

25. The doorbell of claim 24, further comprising coupling the chime adapter to the first external chime such that a first electricity that is less than a first threshold passes through the chime adapter and bypasses at least a portion of the first external chime such that the first electricity does not cause the first external chime to emit a summon sound, and coupling the chime adapter to the first external chime such that a second electricity that is greater than a second threshold passes through the portion of the first external chime and causes the first external chime to emit the summon sound.

26. The method of claim 22, further comprising receiving the first notification with the remote computing device.

27. The method of claim 22, wherein emitting the first notification comprises emitting at least one of a sound and a light from the doorbell in response to the first external chime being incompatible with the doorbell.

28. The method of claim 22, wherein evaluating the first load signature of the first external chime comprises evaluating a second load signature of the doorbell.

29. The method of claim 22, wherein evaluating the first load signature of the first external chime comprises:
evaluating a second load signature of the doorbell;
evaluating a third load signature of a circuit that comprises the doorbell, the external power supply, and the first external chime; and
reducing at least one effect of the second load signature on the third load signature to estimate the first load signature.

30. The doorbell of claim 22, further comprising determining that the first load signature is indicative of the first external chime being incompatible with the doorbell in response to a variability of the first load signature.

* * * * *